(12) United States Patent
Kim et al.

(10) Patent No.: US 10,288,717 B2
(45) Date of Patent: May 14, 2019

(54) ELECTRONIC DEVICE AND METHOD FOR ACQUIRING ADDITIONAL DATA FOR LOCATION INFORMATION ACQUISITION

(71) Applicant: Samsung Electronics Co., Ltd., Gyeonggi-do (KR)

(72) Inventors: Jin-Ik Kim, Seoul (KR); Nam-Joon Park, Gyeonggi-do (KR); Min-Hwan Seo, Gyeonggi-do (KR); Joon-Seok Paik, Gyeonggi-do (KR); Seung-Yoon Lee, Gyeonggi-do (KR); Hyuk-Beom Kwon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 14 days.

(21) Appl. No.: 15/807,873

(22) Filed: Nov. 9, 2017

(65) Prior Publication Data

US 2018/0128896 A1  May 10, 2018

(30) Foreign Application Priority Data

Nov. 10, 2016  (KR) .......................... 10-2016-0149718

(51) Int. Cl.
*H04W 24/00* (2009.01)
*G01S 5/02* (2010.01)
(Continued)

(52) U.S. Cl.
CPC .......... *G01S 5/0257* (2013.01); *G01S 5/0072* (2013.01); *G01S 19/05* (2013.01); *G01S 19/06* (2013.01);
(Continued)

(58) Field of Classification Search
CPC .......... G01S 19/48; G01S 19/05; G01S 19/25; G01S 5/0027; H04W 4/02; H04W 4/008; H04W 4/80; H04L 67/18
(Continued)

(56) References Cited

U.S. PATENT DOCUMENTS

| 7,761,101 B1 * | 7/2010 | Qu ......................... G01S 19/03 455/404.2 |
| 2011/0199917 A1 * | 8/2011 | Karaoguz ............. G01S 5/0284 370/252 |

(Continued)

OTHER PUBLICATIONS

International Search Report dated Feb. 12, 2018.

*Primary Examiner* — Dai Phuong
(74) *Attorney, Agent, or Firm* — Cha & Reiter, LLC.

(57) ABSTRACT

An electronic device and method are disclosed herein. The electronic device includes a communication module, a memory and at least one processor, which implements the method, including responsive to detecting a request to update additional data corresponding to detecting a present location, transmitting a request to update the additional data to at least one external electronic device in communicable range of the communication module, receiving the additional data in response to the transmitted request via the first module of the communication module, detecting a validity of the received additional data, and detecting the present location via the second module of the communication module based at least partially on the additional data if the additional data is detected to be available.

19 Claims, 15 Drawing Sheets

(51) Int. Cl.
*G01S 5/00* (2006.01)
*H04B 1/3827* (2015.01)
*G01S 19/05* (2010.01)
*G01S 19/06* (2010.01)

(52) U.S. Cl.
CPC ..... *H04B 1/385* (2013.01); *H04B 2001/3861* (2013.01)

(58) Field of Classification Search
USPC .... 455/404.1–404.2, 440, 456.1–456.3, 457, 455/556.1–557; 342/357.1–357.49
See application file for complete search history.

(56) References Cited

U.S. PATENT DOCUMENTS

| | | | |
|---|---|---|---|
| 2015/0102960 A1* | 4/2015 | Asrani | G01S 19/48 342/357.31 |
| 2015/0138014 A1* | 5/2015 | Park | G01S 19/27 342/357.25 |
| 2015/0219458 A1* | 8/2015 | Shah | G01C 21/00 701/522 |
| 2016/0050531 A1 | 2/2016 | Choi et al. | |
| 2016/0066147 A1 | 3/2016 | Venkatraman et al. | |
| 2016/0252622 A1 | 9/2016 | Levin et al. | |
| 2016/0253187 A1 | 9/2016 | Kim et al. | |
| 2017/0013590 A1* | 1/2017 | Noorshams | H04W 4/80 |
| 2017/0343963 A1* | 11/2017 | Brown | G04F 10/00 |
| 2018/0293824 A1* | 10/2018 | Turner | H04W 4/029 |

* cited by examiner

ELECTRONIC DEVICE AND METHOD FOR ACQUIRING ADDITIONAL DATA FOR LOCATION INFORMATION ACQUISITION

CLAIM OF PRIORITY

This application claims priority under 35 U.S.C. § 119(a) to Korean Application Serial No. 10-2016-0149718, which was filed in the Korean Intellectual Property Office on Nov. 10, 2016, the entire content of which is hereby incorporated by reference.

TECHNICAL FIELD

The present disclosure relates to an electronic device, and more particularly to an electronic device and a method for acquiring additional data for location information acquisition.

BACKGROUND

Recently, various services and additional functions provided by portable electronic devices have expanded. In order to increase the practical value of electronic devices and meet various demands of users, communication service providers or electronic device manufacturers provide a greater variety of functions and competitively develop electronic devices so as to differentiate them from those of other companies.

With the technological development of the portable electronic device, recent electronic devices are now capable of being mounted onto a wearable device provided in a form that is worn on the body. Such a wearable device may transmit and receive data to and from another electronic device located nearby.

SUMMARY

A wearable device, which is not equipped with a communication module (for example, a cellular module), acquires an initial location from the outside through a GNSS module without Assisted GPS (AGPS) information in order to acquire a location thereof, so that it takes a lot of time to acquire the location and additional data for acquiring the location cannot be updated. Further, the conventional wearable device has a problem in that a large amount of resources (for example, bandwidths) is consumed when the wearable device receives data from neighboring electronic devices through short-range communication.

In an electronic device and a method according to various embodiments of the present disclosure, a wearable device having no communication module (for example, cellular module) may acquire at least one piece of information utilized for acquiring a location from neighboring electronic devices so as to acquire the location of the wearable device.

The present disclosure relates to an electronic device, and more particularly to an electronic device and a method for acquiring additional data for location acquisition.

In accordance with an aspect of the present disclosure, a wearable electronic device is provided, including a communication module including a first module and a second module, a memory, and at least one processor electrically coupled to the communication module and the memory. The processor, responsive to detecting a request to update additional data corresponding to detecting a present location, transmits a request to update the additional data to at least one external electronic device in communicable range of the communication module, receives transmission of the additional data in response to the transmitted request via the first module of the communication module, detects a validity of the received additional data, and detects the present location via the second module of the communication module based at least partially on the additional data when the additional data is detected to be available.

In accordance with another aspect of the present disclosure, a method in a wearable electronic device is disclosed, including responsive to detecting a request to update additional data corresponding to detecting a present location, transmitting a request to update the additional data to at least one external electronic device in communicable range of a communication module, receiving transmission of the additional data in response to the transmitted request via a first module of the communication module, detecting a validity of the received additional data, and detecting the present location via a second module of the communication module based at least partially on the additional data when the additional data is detected to be available.

In accordance with another aspect of the present disclosure, an electronic device is disclosed, including a communication module, a memory, and at least one processor electrically coupled to the communication module and the memory, configured to receive a request to update additional data from an external wearable electronic device, acquire the additional data in response to the request, determine at least one of validity, transmission rate, and lightweight of the acquired additional data, and transmit the additional data to the external wearable electronic device.

According to various embodiments of the present disclosure, through the provision of an electronic device and a method for acquiring additional data for location information acquisition, it is possible to receive and update at least one piece of additional data utilized for acquiring location information from neighboring electronic devices, to lighten data, and to transmit and receive the lightened data to and from the neighboring electronic devices through short-range communication.

According to various embodiments of the present disclosure, the electronic device may acquire GPS additional data utilized for acquiring GPS initial information from neighboring electronic devices and selectively update additional data in a GNSS module based on the validity of GPS additional data, so as to reduce a GPS time to first fix without a communication module (for example, a cellular module). In addition, according to various embodiments of the present disclosure, an electronic device may variably make a request for updating additional data for location acquisition through a sensor of the electronic device or neighboring electronic devices, thereby reducing resources according to a request for access from the neighboring electronic devices.

BRIEF DESCRIPTION OF THE DRAWINGS

The above and other aspects and features of the present disclosure will be more apparent from the following detailed description taken in conjunction with the accompanying drawings, in which.

DETAILED DESCRIPTION

Figure 1:
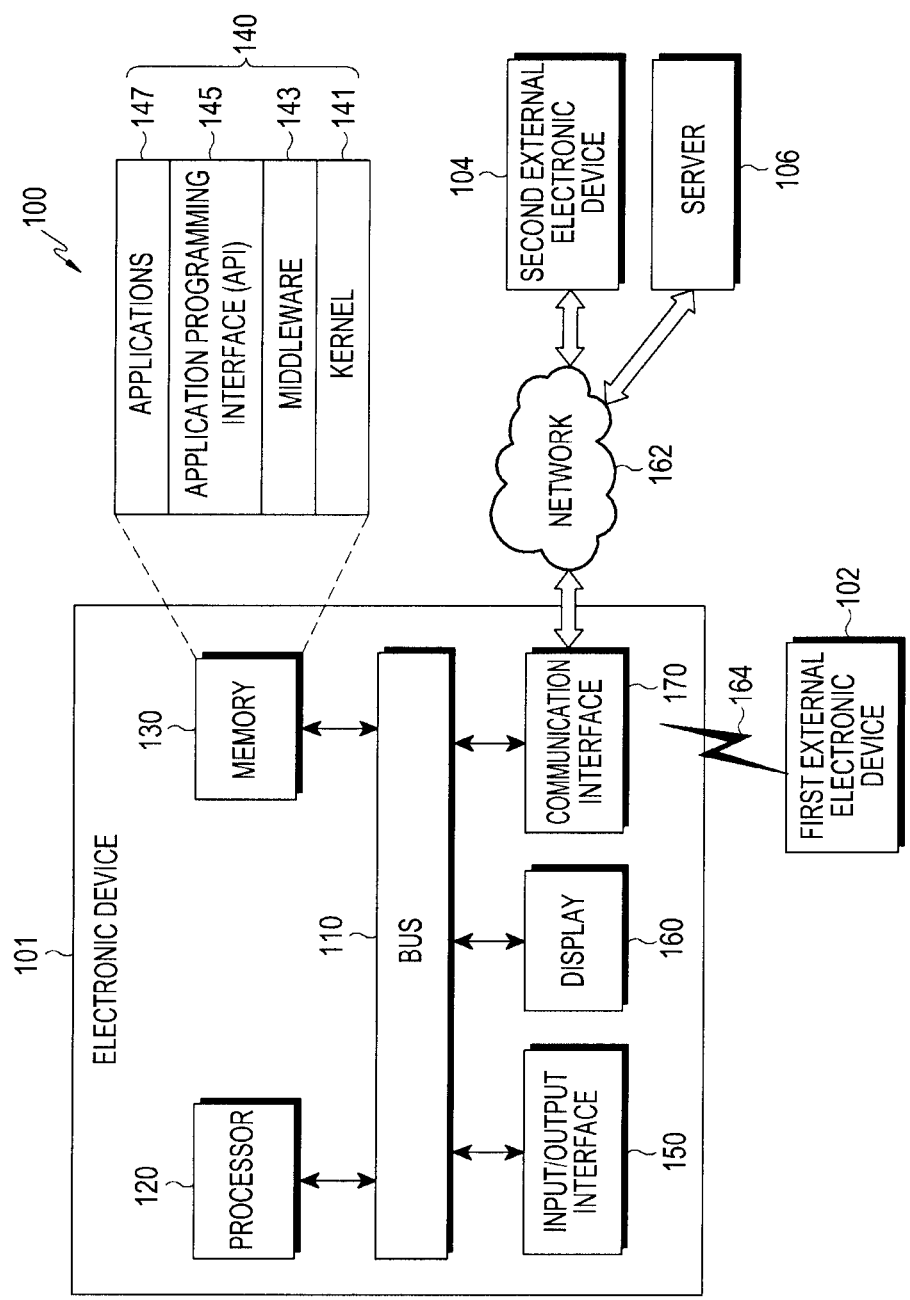
FIG. 1 illustrates an electronic device 101 within a network environment 100 according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In the description of the drawings, similar reference numerals may be used to designate similar elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The smart home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, a charging device and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an electronic device 101 within a network environment 100 according to various embodiments.

The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit which interconnects the components 110 to 170 and delivers communication (for example, a control message and/or data) between the components 110 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the applications 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or load balancing on the one or more task requests by processing the one or more task requests according to the priorities assigned to the one or more application programs.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that can forward instructions or data, which are input from a user or an external device, to the other element(s) of the electronic device 101. Furthermore, the input/output interface 150 may output instructions or data, which are received from the other element(s) of the electronic device 101, to the user or the external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of content (for example, text, images, videos, icons, or symbols) to the user. The display 160 may include a touch screen and may receive, for example, a touch, gesture, proximity, or hovering input using an electronic pen or the user's body part.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long Term Evolution (LTE), LTE-Advanced (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short-range communication 164. The short-range communication 164 may include at least one of, for example, Wi-Fi, Bluetooth, and Near Field Communication (NFC). The GNSS may include at least one of, for example, a Global Positioning System (GPS), a Global Navigation Satellite System (GLONASS), a Beidou Navigation Satellite System (hereinafter referred to as "Beidou"), and a European Global Satellite-based Navigation System (Galileo), according to a use area, a bandwidth, or the like. Hereinafter, in the present disclosure, "GPS" may be interchangeably used with "GNSS". The wired communication may include, for example, at least one of a Universal Serial Bus (USB), a High-Definition Multimedia Interface (HDMI), Recommended Standard 232 (RS-232), a Plain Old Telephone Service (POTS), and the like. The network 162 may include at least one of a communication network such as a computer network (for example, a LAN or a WAN), the Internet, and a telephone network.

Each of the first and second external electronic devices 102 and 104 may be of the same or a different type from the electronic device 101. According to an embodiment, the server 106 may include a group of one or more servers. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition thereto. Another electronic device (for example, the electronic device 102 or 104) may execute the requested functions or the additional functions, and may deliver the result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
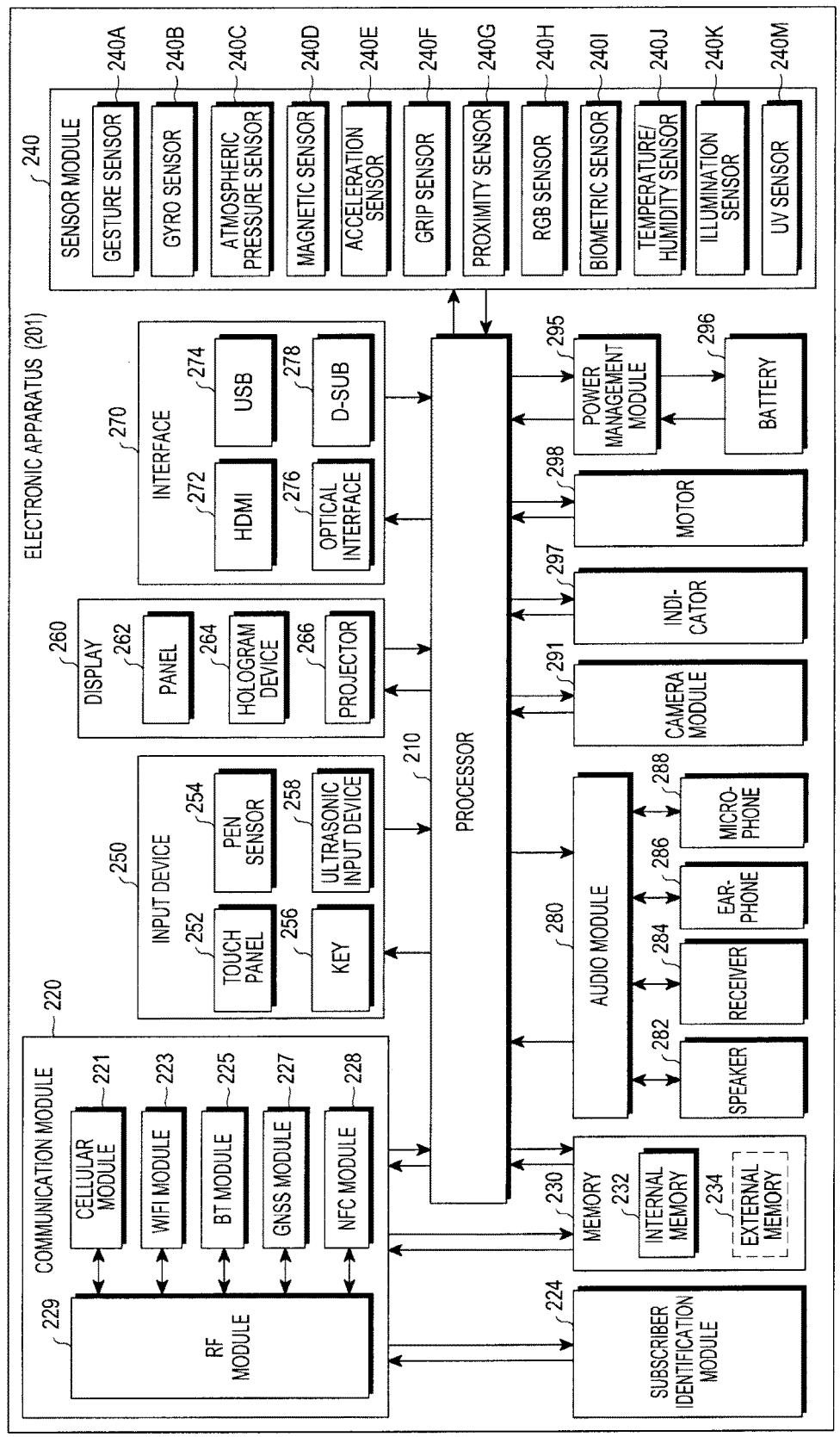
FIG. 2 is a block diagram of an electronic device 201 according to various embodiments.

FIG. 2 is a block diagram of an electronic device 201 according to various embodiments.

The electronic device 201 may include, for example, the whole or part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be implemented by, for example, a System on Chip (SoC). According to an embodiment, the processor 210 may further include a Graphic Processing Unit (GPU) and/or an image signal processor. The processor 210 may also include at least some (for example, a cellular module 221) of the elements illustrated in FIG. 2. The processor 210 may load, in volatile memory, instructions or data received from at least one of the other elements (for example, a non-volatile memory) to process the loaded instructions or data, and may store various types of data in the non-volatile memory.

The communication module 220 may have a configuration identical or similar to that of the communication interface 170 of FIG. 1. The communication module 220 may include, for example, a cellular module 221, a Wi-Fi module 223, a BT module 225, a GNSS module 227 (for example, a GPS module, a GLONASS module, a Beidou module, or a Galileo module), an NFC module 228, and a Radio Frequency (RF) module 229.

The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the corresponding module. According to some embodiments, at least some (for example, two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the BT module 225, the GPS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid-State Drive (SSD), and the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red, Green, and Blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as a single module. The hologram device 264 may show a three-dimensional image in the air using light interference. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like.

The camera module 291 is a device that can photograph a still image and a dynamic image. According to an embodiment, the camera module 29A may include one or more image sensors (for example, a front sensor or a rear sensor), a lens, an Image Signal Processor (ISP), or a flash (for example, an LED, a xenon lamp, and the like).

The power management module 295 may manage, for example, the power of the electronic device 201. The electronic device 201 may be an electronic device receiving power through a battery, but is not limited thereto. According to an embodiment, the power management module 295 may include a Power Management Integrated Circuit (PMIC), a charger Integrated Circuit (IC), or a battery or fuel gauge.

The PMIC may use a wired and/or wireless charging method. Examples of the wireless charging method may include a magnetic-resonance method, a magnetic-induction method, an electromagnetic-wave method, and the like. Additional circuits (for example, a coil loop, a resonance circuit, a rectifier, and the like) for wireless charging may be further included. The battery gauge may measure, for example, the remaining charge of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, and the like. Although not illustrated, the electronic device 201 may include a processing unit (for example, a GPU) for supporting mobile TV. The processing unit for supporting the mobile TV may process media data according to a standard such as Digital Multimedia Broadcasting (DMB), Digital Video Broadcasting (DVB), MediaFlo™, or the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted, or other additional elements may be further included in the electronic device. Also, some of the hardware components according to various embodiments may be combined into a single entity, which may perform functions identical to those of the relevant components before the combination.

Figure 3:
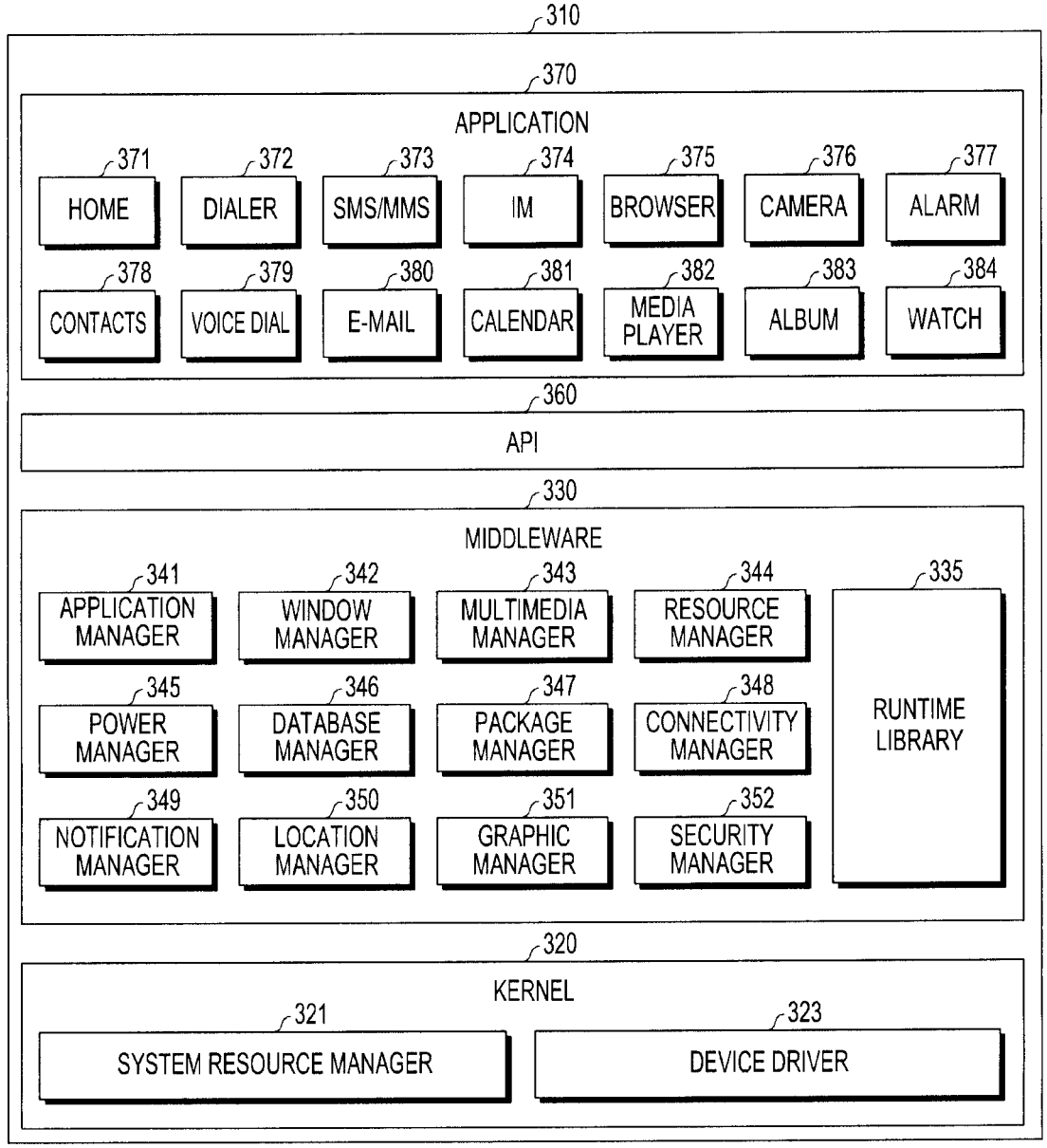
FIG. 3 is a block diagram of a program module according to various embodiments.

FIG. 3 is a block diagram of a program module according to various embodiments.

According to an embodiment, the program module 310 (for example, the program 140) may include an Operating System (OS) that controls resources relating to an electronic device (for example, the electronic device 101) and/or various applications (for example, the application programs 147) running on the operating system. The operating system may be, for example, Android™, iOS™, Windows™, Symbian™, Tizen™, Bada™, and the like.

The program module 310 may include a kernel 320, middleware 330, an Application Programming Interface (API) 360, and/or applications 370. At least a part of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may control, allocate, or retrieve system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function utilized by the applications 370 in common, or may provide various functions to the applications 370 through the API 360 such that the applications 370 can efficiently use the limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, functionality for an arithmetic function, and the like.

The application manager 341 may manage, for example, the life cycle of at least one of the applications 370. The window manager 342 may manage GUI resources used for a screen. The multimedia manager 343 may determine formats utilized to reproduce various media files and may encode or decode a media file using a coder/decoder (codec) appropriate for the corresponding format. The resource manager 344 may manage resources, such as the source code, the memory, the storage space, and the like of at least one of the applications 370.

The power manager 345 may operate together with a Basic Input/Output System (BIOS) to manage a battery or power and may provide power information utilized for the operation of the electronic device. The database manager 346 may generate, search, and/or change a database to be used by at least one of the applications 370. The package manager 347 may manage the installation or update of an application that is distributed in the form of a package file.

The connectivity manager 348 may manage a wireless connection, such as Wi-Fi, Bluetooth, or the like. The notification manager 349 may display or provide notification of an event, such as an arrival message, an appointment, a proximity notification, and the like, in such a manner as not to disturb a user. The location manager 350 may manage the location information of the electronic device. The graphic manager 351 may manage a graphic effect to be provided to a user and a user interface relating to the graphic effect. The security manager 352 may provide various security functions utilized for system security, user authentication, and the like. According to an embodiment, when the electronic device (for example, the electronic device 101) has a telephone call function, the middleware 330 may further include a telephony manager that manages a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (for example, the API 145) is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 (for example, the application programs 147) may include, for example, one or more applications that can perform functions such as home 371, a dialer 372, SMS/MMS 373, Instant Messaging (IM) 374, a browser 375, a camera 376, an alarm 377, contacts 378, a voice dialer 379, e-mail 380, a calendar 381, a media player 382, an album 383, a clock or 'watch' 384, health care (for example, measure exercise quantity or blood sugar), or environment information (for example, atmospheric pressure, humidity, temperature information or the like).

According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 103 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 370 may include applications (for example, a health care application of a mobile medical appliance, and the like) designated according to the attributes of an external electronic device (for example, the electronic device 102 or 104). According to an embodiment, the applications 370 may include applications received from an external electronic device (for example, the server 106 or the electronic device 102 or 104). According to an embodiment, the applications 370 may include a preloaded application or a third-party application that may be downloaded from a server. The names of the elements of the program module 310 according to the embodiment illustrated in the drawing may vary depending on the operating system.

According to various embodiments, at least a part of the program module 310 may be implemented in software, firmware, hardware, or a combination of two or more thereof. At least some of the program module 310 may be implemented (for example, executed) by, for example, the processor (for example, the processor 210). At least a portion of the program module 310 may include, for example, a module, a program, a routine, a set of instructions, and/or a process for performing one or more functions.

Figure 4:
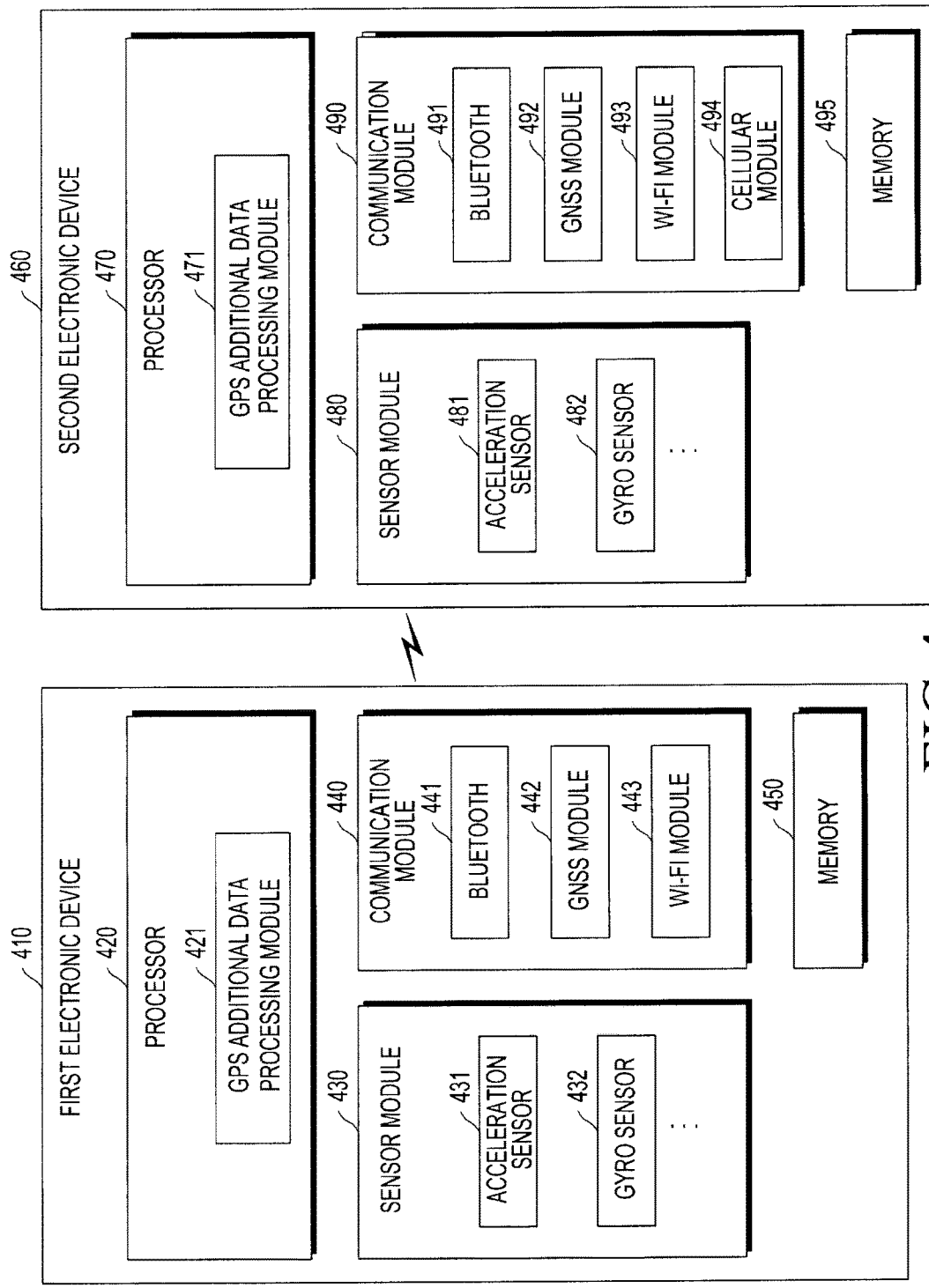
FIG. 4 is a block diagram illustrating a first electronic device and a second electronic device according to various embodiments of the present disclosure.

FIG. 4 is a block diagram illustrating a first electronic device and a second electronic device according to various embodiments of the present disclosure.

Referring to FIG. 4, a first electronic device 410 according to various embodiments of the present disclosure may include a processor 420 including a GPS additional data processing module 421 for determining the validity of additional data as a wearable device, a sensor module 430 including at least one sensor, a communication module 440 including at least one communication module, and a memory 450 for storing additional data for location information acquisition. The GPS additional data processing module 421 may be included in a GNSS module 442.

The processor 420 may perform at least one operation or at least one function performed by the first processor 120 of FIG. 1. The sensor module 430 may include at least one sensor included in the sensor module 240 of FIG. 2 as well as an acceleration sensor 431 and a gyro sensor 432. The communication module 440 may include at least one communication module included in the communication module 220 of FIG. 2 as well as a Bluetooth 441, the GNSS module 442, and a Wi-Fi module 443. The memory 450 may store at least one piece of data and at least one application stored in the memory 130 of FIG. 1. The first electronic device 410 may not include a network communication module (for example, a cellular module). The first electronic device 410 may not directly acquire additional data for location acquisition from a satellite or a network time protocol or "NTP" server but may receive the additional data for location acquisition from a neighboring electronic device (for example, the second electronic device) through a short-range communication scheme (for example, Bluetooth). The first electronic device 410 may identify the second electronic device 460 connected through at least one short-range communication scheme (for example, BT) and transmit a message related to a request for the additional data for location acquisition to the identified second electronic device 460. Further, the first electronic device 410 may acquire location information based on the additional data received from the second electronic device 460 in response to the request and update the additional data in the GNSS module 442. Alternatively, the first electronic device 410 may acquire the location information based on the additional data received from the second electronic device 460 in response to the request. The first electronic device 410 may transmit a message that makes a request for updating the additional data to the second electronic device 460, acquire the location information based on the additional data received in response to the request, and update the additional data. The first electronic device 410 may determine at least one of validity and accuracy of the additional data received from the second electronic device 460. Further, the first electronic device 410 may make a request for NTP time information to the second electronic device 460 and determine the validity or accuracy of the NTP time received in response to the request.

The second electronic device 460 according to various embodiments of the present disclosure may include a processor 470 including a GPS additional data processing module 471 for determining the validity of additional data as a mobile phone, a sensor module 480 including at least one sensor, a communication module 490 including at least one communication module, and a memory 495 for storing additional data for location information acquisition. The GPS additional data processing module 471 may be included in a GNSS module 492.

The processor 470 may perform at least one operation or at least one function performed by the first processor 120. The sensor module 480 may include at least one sensor included in the sensor module 240 of FIG. 2 as well as an acceleration sensor 481 and a gyro sensor 482. The communication module 490 may include at least one communication module included in the communication module 220 of FIG. 2 as well as a Bluetooth 491, a GNSS module 492, a Wi-Fi module 493, and a cellular module 494. The memory 495 may store at least one piece of data and at least one application stored in the memory 130 of FIG. 1. The second electronic device 460 may include the cellular module 494, and the cellular module 494 may be configured within the communication module 490, or may be configured in the second electronic device 460 as a separate element. The second electronic device 460 may also include its own memory 495. The second electronic device 460 may directly receive additional data for location acquisition from a satellite or an NTP server and transmit the additional data for location acquisition from a neighboring electronic device (for example, the first electronic device) through a short-range communication scheme. The second electronic device 460 may transmit at least one piece of additional data to the first electronic device 410 through at least one short-range communication scheme in response to a request for transmission of the additional data to determine the location from the neighboring first electronic device 410. Further, the second electronic device 460 may make a request for the NTP time to the server 106 in response to the request for NTP time information received from the first electronic device 410, determine the validity or accuracy of the NTP time received in response to the request, and transmit a response message including the NTP time information to the first electronic device 410. The second electronic device 460 may acquire a reference location through at least one communication module in response to the request from the first electronic device 410, determine the validity or accuracy of the acquired reference location, and transmit a response message including the reference location to the first electronic device 410. The second electronic device 460 may determine whether a data transmission rate of the first electronic device 410 is acceptable and lighten the additional data to be transmitted to the first electronic device 410. The first electronic device 410 may determine at least one of the validity and the accuracy of the additional data to be transmitted to the second electronic device 460. At least one function or operation performed by the first electronic device 410 may be performed by the second electronic device 460, and at least one function or operation performed by the second electronic device 460 may be performed by the first electronic device 410.

The communication modules 440 and 490 of the first electronic device 410 and the second electronic device 460 may perform short-range communication that manages connection between different kinds of terminals, and may perform connection management, instruction delivery, and file transmission/reception. The GPS additional data processing modules 421 and 471 of the first electronic device 410 and the second electronic device 460 may store GPS additional data (for example, GPS fix additional data) received from the communication modules 440 and 490, determine the validity thereof, and transmit the GPS additional data to the GNSS modules 442 and 492. Although not illustrated, the GPS additional data processing modules 421 and 471 of the first electronic device 410 and the second electronic device 460 may include an NTP time processing module, a reference location processing module, and an ephemeris processing module. The sensor modules 430 and 480 of the first electronic device 410 and the second electronic device 460 may detect a change in surroundings and include an angular speed sensor, an atmospheric pressure sensor, a temperature sensor, a pressure sensor, a flow sensor, a magnetic sensor, a photo sensor, an acoustic sensor, a taste sensor, and an odor sensor as well as the acceleration sensors 431 and 481 and the gyro sensors 432 and 482.

According to various embodiments, a wearable electronic device of the present disclosure may include: a communication module; a memory; and at least one processor electrically connected to the communication module and the memory. When an update of at least one piece of additional data utilized for acquiring location information is requested, the processor may transmit a request for updating the at least one piece of additional data to at least one neighboring electronic device related to the wearable electronic device through a first module included in the communication module, receive at least one piece of the additional data through the first module in response to the request, determine the validity thereof, and acquire location information of the electronic device through a second module included in the communication module based on at least one piece of the additional data of which the validity is determined.

According to an embodiment, the processor may be configured to determine whether the update of at least one piece of the additional data is needed.

According to an embodiment, at least one piece of the additional data may include at least one piece of server-based Network Time Protocol (NTP) time information, network-based reference location information, and satellite-based ephemeris information.

According to an embodiment, the first module may be a Bluetooth module, and the second module may be a Global Navigation Satellite System (GNSS) module.

According to an embodiment, the processor may be configured to store at least one piece of the received additional data in the memory and to update at least one piece of the received additional data to the second module.

According to an embodiment, the processor may determine the validity of at least one piece of the received additional data using server-based NTP time information included in at least one piece of the received additional data, and the validity may be determined such that at least one piece of the received additional data is available (or valid) when a difference between a system time at which the at least one neighboring electronic device transmits a request to a server and a system time at which a response to the request is received is within a predetermined time.

According to an embodiment, when an update of satellite-based ephemeris information is needed in response to a location change of the electronic device, the processor may be configured to transmit a request for updating the determined location to the at least one electronic device.

According to an embodiment, when an update of the NTP time information is needed, the processor may be configured to make a request for the NTP time information to the at least one neighboring electronic device and to receive at least one piece of the additional data including the NTP time in response to the request, and at least one piece of the additional data may include a time difference between a time at which the at least one neighboring electronic device makes a request for the NTP time to the server and a time at which an NTP response is received from the server, and the time difference is calculated by the at least one neighboring electronic device.

According to an embodiment, when an update of the reference location is needed, the processor may be configured to make a request for the reference location to the at least one neighboring electronic device and to receive at least one piece of the additional data including the reference location in response to the request, and the reference location may be acquired by at least one of a GNSS module, a Wi-Fi module, and a cellular module included in the at least one neighboring electronic device.

According to an embodiment, when a location request is made by a predetermined application of the electronic device, the processor may be configured to determine whether to use location information updated to the second module of the electronic device based on a reference location acquisition method and accuracy pre-stored in the memory.

According to an embodiment, when the reference location acquisition method is a method based on a cellular module of the at least one neighboring electronic device and the accuracy is within a predetermined range, the processor may be configured not to use (e.g., to reject) the location information updated to the second module.

According to an embodiment, the processor may be configured to determine a current location based on the reference location updated to the second module and to determine an update period of the ephemeris information by comparing a latitude of the determined current location with a preset threshold value.

According to an embodiment, the processor may be configured to receive a request for identifying the existence and the validity of the location information from the at least one neighboring electronic device, when the location information does not exist or is not valid, make a request for the location information to the at least one neighboring electronic device, and receive additional data including the location information from the at least one neighboring electronic device in response to the request.

According to an embodiment, the received data may be data of which at least one of validity, transmission rate, and lightening is determined by the at least one neighboring electronic device.

According to various embodiments, an electronic device for transmitting additional data including location information to a wearable electronic device may include: a communication module; a memory; and at least one processor electrically connected to the communication module and the memory. The processor may receive a request for updating additional data from the wearable electronic device, acquire the additional data in response to the request, determine at least one of validity, transmission rate, and lightening of the acquired additional data, and transmit the determined additional data to the wearable electronic device.

According to an embodiment, the acquired additional data may include at least one piece of server-based Network Time Protocol (NTP) time information, network-based reference location information, and satellite-based ephemeris information.

Figure 5:
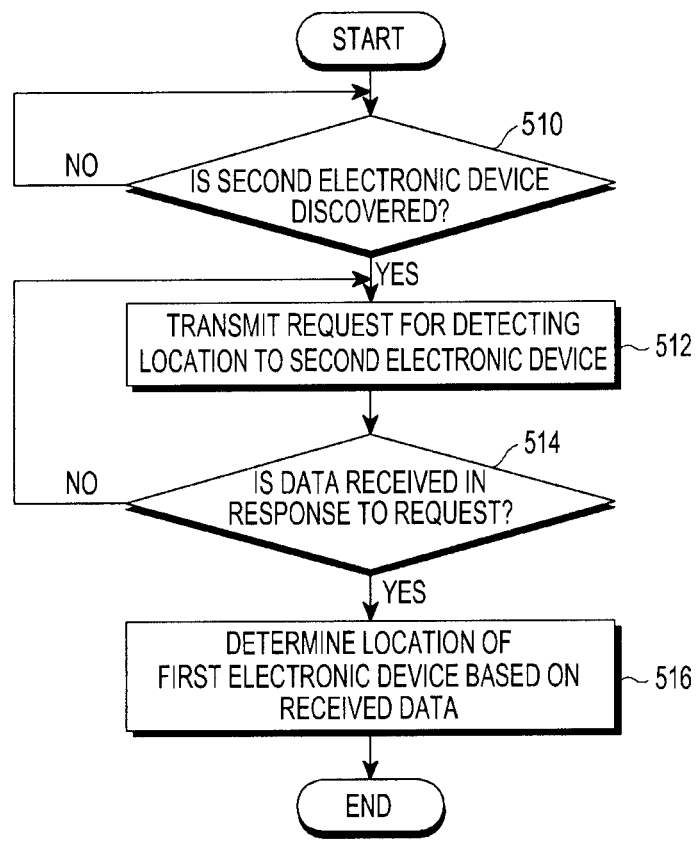
FIG. 5 is a flowchart illustrating the operation of acquiring additional data for location information acquisition by the electronic device according to various embodiments of the present disclosure.

FIG. 5 is a flowchart illustrating the operation of acquiring additional data for location information acquisition by the electronic device according to various embodiments of the present disclosure.

Hereinafter, the operation of acquiring additional data for location information acquisition by the electronic device according to various embodiments of the present disclosure will be described in detail with reference to FIG. 5.

In operation 510, the first electronic device may identify the second electronic device. The first electronic device 410 may discover the neighboring second electronic device 460 based on a connection through at least one short-range wireless communication scheme. When the second electronic device is not identified through at least one short-range wireless communication scheme, the first electronic device 410 may discover connectable or available neighboring electronic devices and transmit a request to establish the connection to the corresponding device. The first electronic device 410 may scan for at least one other connectable electronic device near the first electronic device 410 and identify the connectable (or available) electronic device among one or more discovered electronic devices. When the neighboring second electronic device is found but not available, the first electronic device 410 may transmit an instruction to activate the short-range communication module of the scanned second electronic device to the scanned second electronic device. When the short-range communication module of the scanned second electronic device is activated, the first electronic device 410 may reattempt connection with the scanned second electronic device. The first electronic device 410 is not equipped with the cellular module therein and thus cannot receive Global Positioning System (GPS) information directly from the server, but the second electronic device 460 is equipped with the cellular module 494 for receiving GPS information from an external electronic device (for example, a GNSS satellite or the server).

In operation 512, the first electronic device may transmit a request for detecting the location to the second electronic device. The first electronic device 410 may transmit a message related to the request for additional data utilized for detecting the location to the second electronic device 460 through the communication module (for example, via Bluetooth communication). After being connected to the second electronic device 460, the first electronic device 410 may transmit the request for the additional data (for example, a GPS fix as the additional data) utilized for detecting the location of the first electronic device 410 to the second electronic device 460.

In operation 514, the first electronic device may receive the additional data in response to the request. The first electronic device 410 may receive the additional data (for example, GPS fix additional data) from the second electronic device in response to the request for the additional data (for example, GPS fix additional data) utilized for detecting the location of the first electronic device 410. The first electronic device 410 may store the received additional data in the memory 450. The first electronic device 410 may update the received additional data in the Global Navigation Satellite System (GNSS) module included in the communication module 440.

In operation 516, the first electronic device may determine the location based on the received additional data. The first electronic device 410 may determine the current location of the first electronic device 410 based on the additional data updated in the GNSS module. The first electronic device 410 may determine the current location based on the additional data stored in the memory 450 or the location information updated in the GNSS module in response to the request for the current location of the first electronic device 410 in response to a request from a user or an executed application.

According to various embodiments, a method of acquiring location information by a wearable electronic device including a communication module, a memory, and at least one processor electrically connected to the communication module and the memory may include an operation of, when an update of at least one piece of additional data utilized for acquiring location information is requested, transmitting a request for updating the at least one piece of additional data to at least one neighboring electronic device related to the wearable electronic device through a first module included in the communication module, an operation of receiving at least one piece of the additional data through the first module in response to the request and determining the validity thereof, and an operation of acquiring location information of the electronic device through a second module included in the communication module based on at least one piece of the additional data of which the validity is determined.

According to an embodiment, the method may further include an operation of storing at least one piece of the received additional data in the memory and an operation of updating at least one piece of the received additional data to the second module.

According to an embodiment, the method may further include an operation of determining the validity of at least one piece of the received additional data using server-based NTP time information included in at least one piece of the received additional data, and the validity may be determined such that at least one piece of the received additional data is available (or valid) when a difference between a system time at which the at least one neighboring electronic device transmits a request to a server and a system time at which a response to the request is received is shorter than a predetermined time period.

According to an embodiment, the method may further include an operation of determining whether an update of satellite-based ephemeris information is needed in response to a location change of the electronic device and an operation of transmitting a request for updating the determined location to the at least one electronic device.

Figure 6:
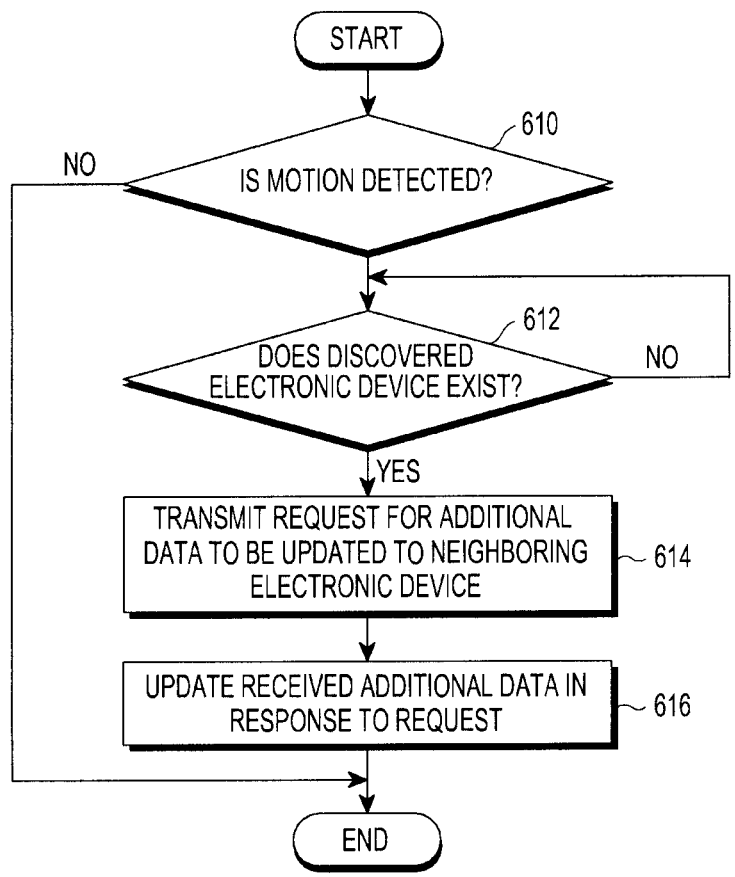
FIG. 6 is a flowchart illustrating the operation of updating additional data for location information acquisition by the electronic device according to various embodiments of the present disclosure.

FIG. 6 is a flowchart illustrating the operation of updating additional data for location information acquisition by the electronic device according to various embodiments of the present disclosure.

Hereinafter, the operation of updating additional data for acquisition of location information of the electronic device according to various embodiments of the present disclosure will be described in detail with reference to FIG. 6.

In operation 610, the electronic device can determine whether a motion is detected. If so, the electronic device may update the additional data. When at least one motion such as a location change is detected, the first electronic device 410 may determine that the additional data needs to be updated. When the location change is detected, the first electronic device 410 may update the additional data (for example, GPS fix additional data) for location information acquisition. After receiving the additional data for location information acquisition from the second electronic device 460 and updating the additional data in the GNSS module, the first electronic device 410 may determine whether the additional data needs to be updated when a predetermined time passes or when the location of the user carrying the first electronic device 410 is changed. For example, for the GPS location and ephemeris, a request for updating additional data to be acquired may be variably transmitted to the second electronic device 460 based on Activity Recognition (AR) information and a previously updated user's reference location. The first electronic device 410 may detect the motion based on at least one piece of sensor data acquired through the sensor module 430 and determine the state of the user. For example, when the state of the user corresponds to walking and the walking state continues, the first electronic device 410 may determine that motion is detected and that a location change from the previous location occurs.

In operation 612, when the motion is detected, the first electronic device 410 may discover the neighboring second electronic device 460. When the motion is detected based on at least one portion of sensor data acquired through the sensor module 430, the first electronic device 410 may discover the neighboring second electronic device 460 that is connected through at least one short-range wireless communication scheme. When the second electronic device is not identified through at least one short-range wireless communication scheme, the first electronic device 410 may discover connectable or available neighboring electronic devices and make a request for connection to the corresponding device. The first electronic device 410 may scan for at least one other connectable electronic device near the first electronic device 410 and identify the connectable (or available) electronic device among at least one other scanned electronic device. When the neighboring second electronic device is found but not available, the first electronic device 410 may transmit an instruction to activate the short-range communication module of the scanned second electronic device to the scanned second electronic device. When the short-range communication module of the scanned second electronic device is activated, the first electronic device 410 may reattempt the connection to the scanned second electronic device.

In operation 614, the electronic device may transmit a request for additional data for location information update to the neighboring device. The first electronic device 410 may transmit the request for the additional data for updating the location information of the first electronic device to at least one discovered neighboring device (for example, the second electronic device 460). After being connected to the second electronic device 460 through short-range communication, the first electronic device 410 may transmit the request for the additional data, utilized for detecting the location of the first electronic device 410, to the second electronic device 460. The request may include at least one of a server-based Network Time Protocol (NTP) time request, a network-based reference location request, and a satellite-based ephemeris request.

In operation 616, the electronic device may update location information based on the additional data in response to the request. The first electronic device 410 may receive the additional data from at least one neighboring electronic device (for example, the second electronic device 460) in response to the request for the additional data utilized for updating the location information of the first electronic device 410. The first electronic device 410 may store the received additional data in the memory 450. The first electronic device 410 may acquire the location information included in the received additional data and update the received additional data in the Global Navigation Satellite System (GNSS) module 422 included in the communication module 440. The first electronic device 410 may update the current location of the first electronic device 410 based on the additional data updated in the GNSS module 442. The received additional data may include at least one piece of the server-based NTP time information, the network-based reference location information, and the satellite-based ephemeris information. For example, when there is a request for updating the NTP time, the first electronic device 410 may make the request for the NTP time to the second electronic device 460 and receive additional data including the NTP time in response to the request. The additional data may include a time difference between a time at which the second electronic device 460 makes the request for the NTP time to a third electronic device (for example, the server 106) and an NTP response time received from the third electronic device (for example, the server 106). The time difference may be calculated by the second electronic device 460. According to another embodiment, when there is a request for the reference location, the first electronic device 410 may make the request for the reference location to the second electronic device 460 and receive the additional data including the reference location in response to the request. The reference location may be acquired by at least one of the GNSS module, the Wi-Fi module, and the network cell module included in the second electronic device 460.

Figure 7:
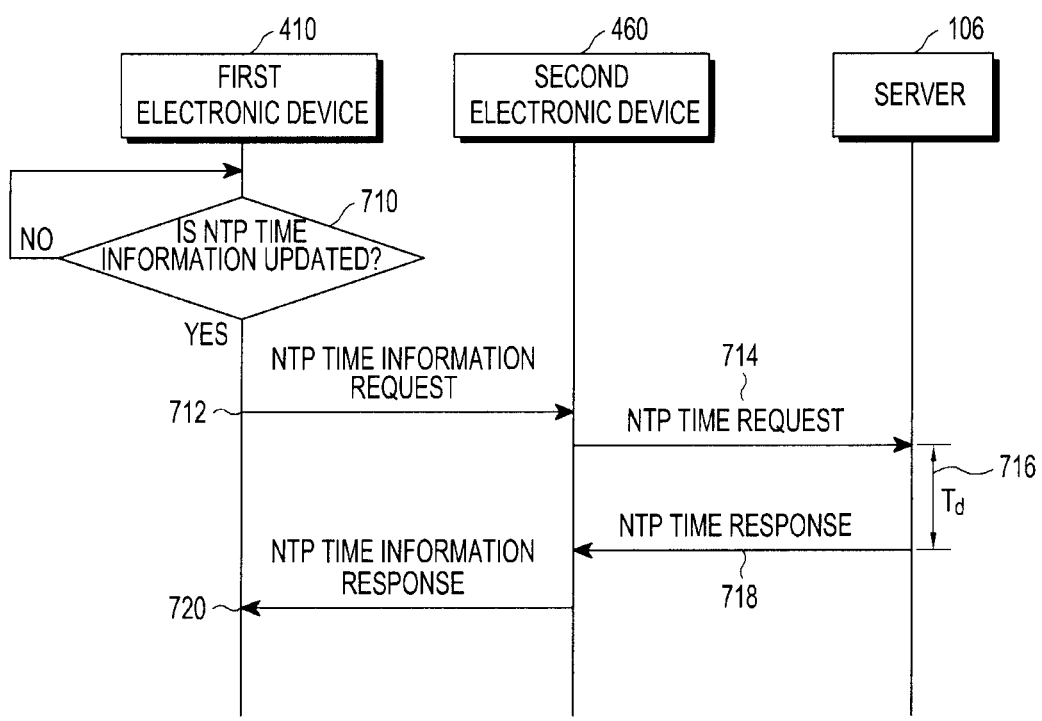
FIG. 7 is a flowchart illustrating the operation of updating a network time protocol (NTP) time information by the electronic device according to an embodiment of the present disclosure.

FIG. 7 is a flowchart illustrating the operation of updating NTP time information by the electronic device according to an embodiment of the present disclosure.

Hereinafter, the operation of updating NTP time information by the electronic device according to an embodiment of the present disclosure will be described in detail with reference to FIG. 7.

In operation 710, the first electronic device 410 may determine whether an update of the NTP time information is needed. The first electronic device 410 may determine that the update of the NTP time is needed when the location change is detected or when a predetermined time passes after the NTP time information was previously received. The first electronic device 410 may receive the NTP time information from the server 106 through the second electronic device 460 and use the received NTP time information for acquiring a GPS initial location so as to reduce a Time To First Fix (TTFF). When a predetermined time passes after the initial NTP time information is received from the second electronic device 460 or when a location of the user having the first electronic device 410 is changed, the first electronic device 410 may determine that the update of the NTP time information is needed.

When the first electronic device 410 determines that the update of the NTP time information is needed, the first electronic device 410 may transmit an NTP time information request to the second electronic device 460 in operation 712. The first electronic device 410 may transmit a request for updating the NTP time information of the first electronic device to the second electronic device 460. After being connected to the second electronic device 460 through short-range communication, the first electronic device 410 may transmit a request for additional data required for updating the time information of the first electronic device 410 to the second electronic device 460.

In operation 714, the second electronic device 460 may transmit an NTP time request to the server 106. When receiving the NTP time information request from the first electronic device 410, the second electronic device 460 may transmit the received NTP time information request to the server 106.

In operation 718, the server 106 may transmit an NTP time response to the second electronic device 460. The second electronic device 460 may receive the NTP time response in response to the request transmitted to the server 106. After a predetermined time 716 (for example, $T_d$), the second electronic device 460 may receive the NTP time response according to a network state in response to the request transmitted to the server 106. For example, when a transmission ratio of the network is above a predetermined threshold, the second electronic device 460 may immediately receive the NTP time response in response to the request transmitted to the server 106. For example, when the transmission ratio of the network between the second electronic device 460 and the server 106 is not above the predetermined threshold and thus a delay occurs, a difference between the time at which the request is transmitted in operation 714 and the time at which the response is received in response to the request of operation 714 in operation 718 may be large. The second electronic device 460 may calculate the time difference (for example, $T_d$) and generate an NTP time information response including the calculated time difference.

In operation 720, the second electronic device 460 may transmit the NTP time information response to the first electronic device 410. The second electronic device 460 may calculate the difference between the time at which the NTP time request is transmitted in operation 714 and the time at which the NTP time response is received from the server 106 and generate the NTP time information response including information indicating the calculated difference. Further, the second electronic device 460 may transmit the generated NTP Time information response to the first electronic device 410. The second electronic device 460 may determine the validity of the NTP time information through the server-based NTP time information received from the server 106. Alternatively, the first electronic device 410 may determine the validity of the NTP time information through the NTP time information received from the second electronic device 460. When the difference between a system time at which the second electronic device 460 transmits a request to the server 106 and a system time at which the second electronic device 460 receives a response is within a predetermined time, the validity may be determined such that the received additional data is available (or valid). The second electronic device 460 may define the time difference as uncertainty, and use an uncertainty value for determining the validity of the NTP time. For example, when the time difference (Ta) is greater than or equal to a predetermined time (for example, 2 seconds), the first electronic device 410 may determine that the NTP time is inaccurate. When it is determined that the NTP time is inaccurate, the first electronic device 410 may not use the NTP time as update information of the GNSS module of the first electronic device 410 and may make a request for the NTP time again to the server 106 through the second electronic device 460.

Figure 8:
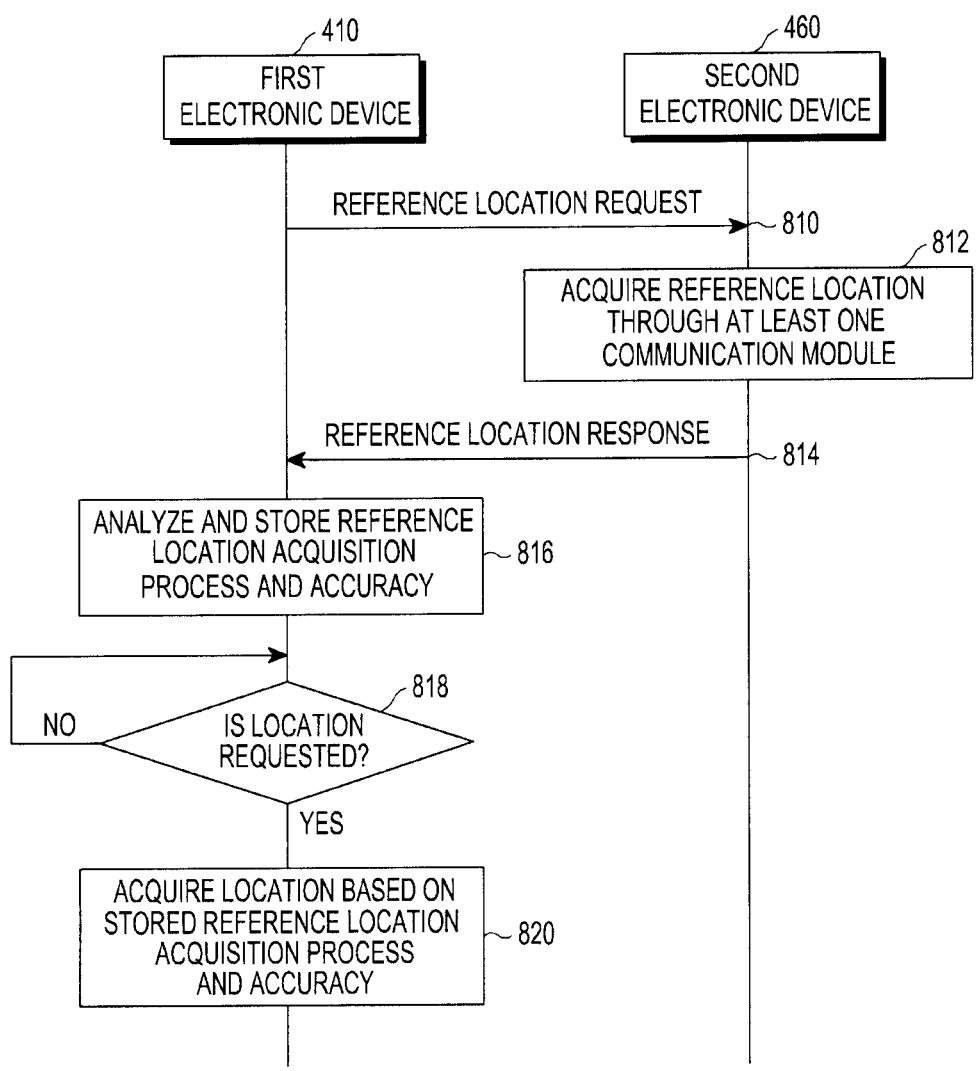
FIG. 8 is a flowchart illustrating the operation of updating additional data for reference location information acquisition by the electronic device according to an embodiment of the present disclosure.

FIG. 8 is a flowchart illustrating the operation of updating additional data for reference location information acquisition by the electronic device according to an embodiment of the present disclosure.

Hereinafter, the operation of updating additional data for reference location information acquisition by the electronic device according to an embodiment of the present disclosure will be described in detail with reference to FIG. 8.

In operation 810, the first electronic device may transmit a request for a reference location. The first electronic device 410 may transmit a reference location request for updating the reference location to the second electronic device 460. The first electronic device 410 may determine the need to update the reference location pre-stored in the memory 450 and transmit the request for the location update to the second electronic device 460. When a location change is detected, the first electronic device 410 may detect the need to update the reference location. When the location change is detected, the first electronic device 410 may update additional data (such as, for example, GPS fix additional data). When a predetermined time passes after the first electronic device 410 receives initial reference location information from the second electronic device 460 and updates the received initial reference location information in the GNSS module or when the location of the user having the first electronic device 410 is changed, the first electronic device 410 may determine that the update of the reference location information is needed. When a location request is made from a particular application of the first electronic device 410, the first electronic device 410 may determine whether to use updated information in the GNSS module 442 based on a reference location acquisition method information and accuracy information stored in the memory 450.

According to an embodiment, when the acquisition method of the reference location stored in the memory 450 corresponds to a network cell method and the accuracy corresponds to 3 km, the first electronic device 410 may not use GNSS module update information. When an error in the distance between the reference location and the user's location is small, the TTFF may be reduced in the GNSS module. Further, when user's movement occurs, the accuracy of the reference location decreases, and in order to reduce the TTFF in the GNSS module, it may be desirable to periodically update the reference location.

According to an embodiment of the present disclosure, the time at which the user moves is estimated based on AR information of the sensor module, and when it is determined that the user's location is changed as much as the location update is needed, the reference location may be updated. For example, the update of the reference location from the second electronic device 460 may be variable. The change in the user's location may be determined using a Wi-Fi scan list change or a cell scan list change as well as the AR information of the sensor module.

In operation 812, the second electronic device may acquire the reference location through at least one communication module. The second electronic device 460 may receive a reference location request from the first electronic device 410. The second electronic device 460 may acquire the reference location through at least one provided communication module. In order to update the reference location of the first electronic device 410, the second electronic device 460 may activate at least one communication module included in the second electronic device 460 and acquire the reference location using the activated communication module. The second electronic device 460 may acquire the reference location through at least one of the GNSS module 492, the Wi-Fi module 493, and the cellular module 494 according to the GNSS and the network state.

In operation 814, the second electronic device 460 may respond to the reference location. The second electronic device 460 may transmit a response to the reference location to the first electronic device 410. The second electronic device 460 may transmit additional data, including a data indicating the specific process of acquiring the reference location by the second electronic device 460 and accuracy information, to the first electronic device 410. The first electronic device 410 may receive the additional data including the reference location acquisition (or positioning) process data, and the reference location accuracy information from the second electronic device 460 in response to the reference location request.

In operation 816, the electronic device may analyze and store the reference location acquisition method and accuracy. The first electronic device 410 may analyze the reference location acquisition method and accuracy based on the additional data received from the second electronic device 460. The first electronic device 410 may receive additional data in response to an additional data request utilized for updating the reference location information of the first electronic device 410. The first electronic device 410 may store the received additional data in the memory 450. The first electronic device 410 may acquire the reference location based on the received additional data and update the additional data in the Global Navigation Satellite System (GNSS) module included in the communication module 440. The first electronic device 410 may update the current location of the first electronic device 410 based on the additional data updated in the GNSS module. The received additional data may include at least one of the reference location acquisition method and accuracy. For example, when a request for the reference location is made, the first electronic device 410 may make the request for the reference location to the second electronic device 460 and receive additional data including the reference location in response to the request. The reference location may be acquired by at least one of the GNSS module, the Wi-Fi module, and the network cell module included in the second electronic device 460.

In operation 818, the electronic device may detect a location request. The first electronic device 410 may receive a request for the reference location by a request from the user or an executed application. Alternatively, the first electronic device 410 may receive the request for the reference location from another electronic device (for example, the second electronic device 460).

In operation 820, the electronic device may acquire the location based on the stored reference location acquisition method and accuracy. The first electronic device 410 may determine the current location of the first electronic device 410 based on the location information updated in the GNSS module. The first electronic device 410 may determine the current location based on the additional data stored in the memory 450 or the location information updated in the GNSS module in response to the request for the current location of the first electronic device 410 by a request from the user or the executed application. The first electronic device 410 may determine whether to use updated information in the GNSS module based on the acquisition method information and the accuracy information, and then acquire an initial location. Also, when the reference location acquisition method pre-stored in the memory 450 corresponds to a network cell method and the accuracy corresponds to a value within a predetermined range (for example, 3 km), the first electronic device 410 may not use the reference location information updated in the GNSS module.

Figure 9:
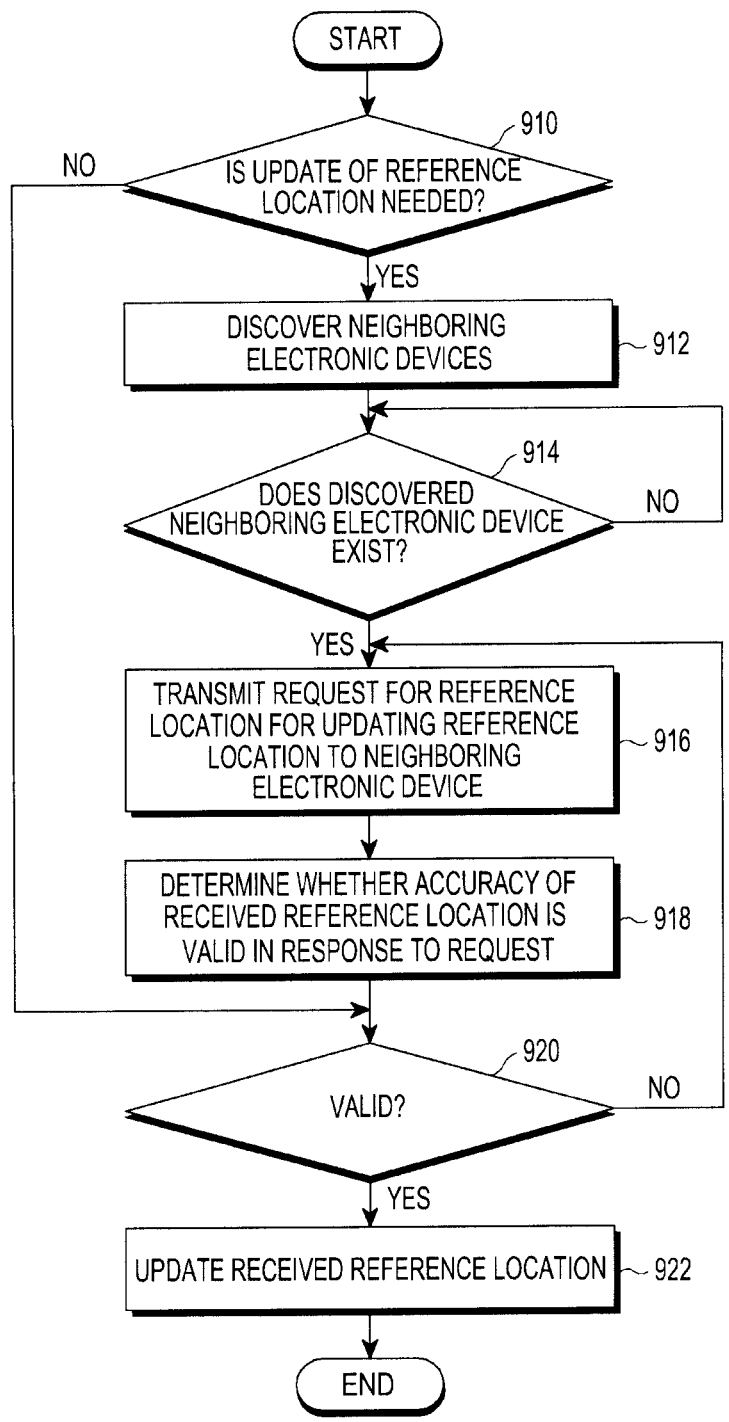
FIG. 9 is a flowchart illustrating the operation of updating the reference location of the electronic device according to another embodiment of the present disclosure.

FIG. 9 is a flowchart illustrating the operation of updating the reference location of the electronic device according to another embodiment of the present disclosure.

Hereinafter, the operation of updating the reference location of the electronic device according to another embodiment of the present disclosure will be described in detail with reference to FIG. 9.

In operation 910, the electronic device may determine whether to update the reference location. When the reference location is changed, the electronic device may update the reference location information. When a location change is detected, the first electronic device 410 may determine the need to update the reference location information. When the location change is detected, the first electronic device 410 may update additional data (for example, GPS fix additional data). When a predetermined time passes after the first electronic device 410 receives the reference location information from the second electronic device 460 and updates the reference location information in the GNSS module or when the location of the user having the first electronic device 410 is changed, the first electronic device 410 may determine that the update of the reference location information is needed. For example, for the GPS location and ephemeris, a request for updating additional data to be acquired may be variably transmitted to the second electronic device 460 based on Activity Recognition (AR) information and a previously updated user's reference location. For example, when the first electronic device 410 moves, the accuracy of the reference location may be deteriorated. In this case, the first electronic device 410 may periodically update the reference location in order to reduce the TTFF in the GNSS module 442. The first electronic device 410 may estimate the time at which the user moves based on AR information of the sensor module 430, and, if it is determined that the update of the reference location is needed, update the reference location. Further, the first electronic device 410 may determine the movement or the location change through a Wi-Fi scan list change or a cell scan list change as well as the sensor module.

In operation 912, the electronic device may search for and discover neighboring electronic devices. The first electronic device 410 may discover the second electronic device 460 located adjacent to the first electronic device 410 in order to update the reference location. The first electronic device 410 may scan for at least one neighboring electronic device which can be connected thereto, and determine a connectable (or available) electronic device among one or more discovered electronic devices. According to another embodiment, the first electronic device 410 may identify at least one second electronic device 460 connected through at least one short-range wireless communication scheme, and, when there is a connected device, make a request for the reference location to the corresponding device.

In operation 914, the electronic device may determine whether there is a discovered electronic device. The first electronic device 410 may discover at least one electronic device by scanning the surroundings. The first electronic device 410 may determine an electronic device to use in order to update the reference location information among at least one discovered electronic device. The determined electronic device may be the second electronic device 460 transmitting the reference location information in FIG. 5 or another electronic device.

In operation 916, the electronic device may transmit a request for updating the reference location information to the neighboring device. The first electronic device 410 may transmit the request for updating the reference location information of the first electronic device to the second electronic device 460. After being connected to the second electronic device 460 through short-range communication, the first electronic device 410 may transmit the request for updating the reference location of the first electronic device 410 to the second electronic device 460. The request may include a network-based reference location request.

In operation 918, the electronic device may update the received reference location information in response to the request. The first electronic device 410 may receive the reference location information in response to the request for the reference location information of the first electronic device 410. The first electronic device 410 may store the received reference location information in the memory 450. The first electronic device 410 may update the received reference location information in the Global Navigation Satellite System (GNSS) module included in the communication module 440. The first electronic device 410 may update the current location of the first electronic device 410 based on the reference location information updated in the GNSS module. When the request for updating the reference location is made, the first electronic device 410 may make the request for the reference location to the second electronic device 460 and receive the reference location in response to the request. The reference location may be acquired by at least one of the GNSS module, the Wi-Fi module, and the network cell module included in the second electronic device 460.

In operation 920, the electronic device may determine whether the received reference location is available (or valid). The first electronic device 410 may determine whether the reference location received from the second electronic device 460 is available (or valid) or not. For example, the first electronic device 410 may calculate the difference between the time at which the request for the reference location is transmitted and the time at which the response to the reference request is received, and determine whether the reference location is available (or valid) based on the calculated difference. The first electronic device 410 may determine the validity based on server-based NTP time information received from the server 106. Alternatively, when the accuracy of the reference location does not correspond to the accuracy that an application executed in the first electronic device desires, the first electronic device 410 may determine that the reference location is not valid. When the reference location received from the second electronic device 460 is not valid, the first electronic device 410 may retransmit the request for updating the reference location information of the first electronic device to the second electronic device 460.

In operation 922, the electronic device may update the received reference location. The first electronic device 410 may receive additional data in response to the request for additional data utilized for updating the reference location information of the first electronic device 410. The first electronic device 410 may store the received additional data in the memory 450. The first electronic device 410 may update the reference location information included in the received additional data in the Global Navigation Satellite System (GNSS) module included in the communication module 440. The first electronic device 410 may update the current location of the first electronic device 410 based on the reference location information updated in the GNSS module. The received additional data may include at least one piece of the server-based NTP time information, the network-based reference location information, and the satellite-based ephemeris information.

Figure 10:
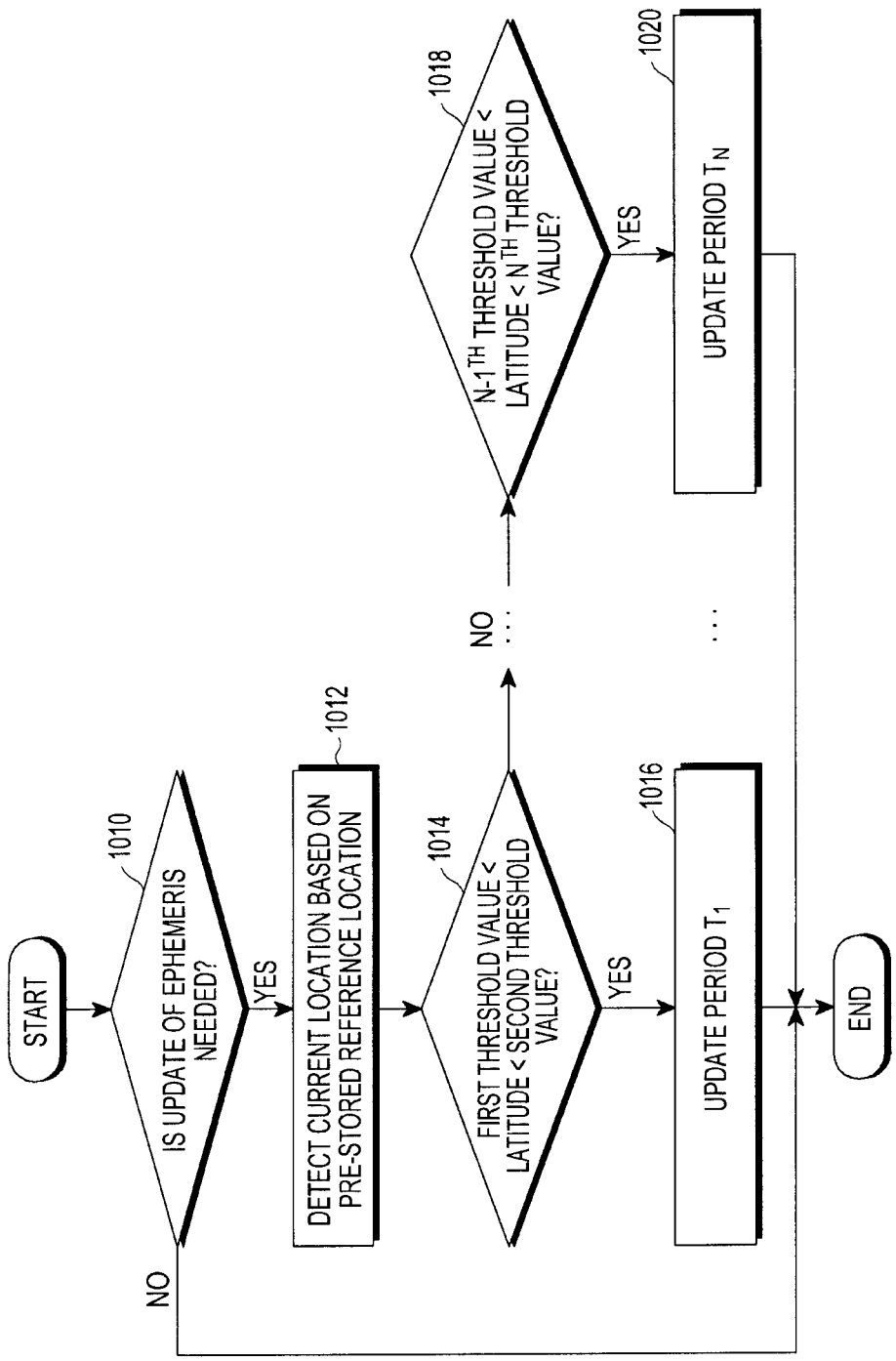
FIG. 10 is a flowchart illustrating the operation of updating ephemeris information by the electronic device according to an embodiment of the present disclosure.

FIG. 10 is a flowchart illustrating the operation of updating ephemeris information by the electronic device according to an embodiment of the present disclosure.

Hereinafter, the operation of updating ephemeris information by the electronic device according to an embodiment of the present disclosure will be described in detail with reference to FIG. 10.

In operation 1010, the electronic device may determine whether the update of satellite-based ephemeris information is needed. When a location change is detected, the first electronic device 410 may determine that the update of satellite-based ephemeris information is needed. The ephemeris information corresponds to location information of each satellite provided from a GPS satellite, and when the location is acquired using GPS, there may be errors due to various factors, such as an error in a GPS satellite, a clock error between a receiver and a satellite, and an error attributable to the ionosphere or a convection zone. When such error exists, positioning accuracy may be deteriorated, and thus it is required to periodically update ephemeris. When the location change is detected, the first electronic device 410 may update additional data (for example, GPS fix additional data). When a predetermined time passes after the first electronic device 410 receives ephemeris information from the second electronic device 460 and updates the received ephemeris information in the GNSS module or when the location of the user having the first electronic device 410 is changed, the first electronic device 410 may determine that the update of the ephemeris information is needed. For example, for the GPS location and ephemeris, a request for updating additional data to be acquired may be variably transmitted to the second electronic device 460 based on Activity Recognition (AR) information and a previously updated user's reference location. When a predetermined time passes or a satellite orbit is changed, the first electronic device 410 may determine the need to update the ephemeris information.

In operation 1012, the electronic device may determine the current location based on the pre-stored reference location. The first electronic device 410 may calculate geographic information of the user's current location from the reference location pre-stored in the memory 450 in order to variably make a request for an update period of the ephemeris information to the second electronic device 460.

In operation 1014, the electronic device may compare a latitude value of the current location with a preset threshold value. The first electronic device 410 may set an ephemeris update period by comparing the detected latitude value of the current location with a preset first threshold value and a second threshold value. The first electronic device 410 may determine whether the detected latitude value of the current location exists within a range of the first threshold value and the second threshold value. The first electronic device 410 may determine whether the latitude value is larger than the first threshold value and smaller than the second threshold value. For example, when the latitude value is larger than the first threshold value and smaller than the second threshold value, the first electronic device 410 may set the ephemeris update period as a time $T_1$. For example, when the latitude value is larger than the second threshold value and smaller than a third threshold value, the first electronic device 410 may set the ephemeris update period as a time $T_2$ and make a request for updating the ephemeris to the second electronic device 460 at every time $T_2$.

In operation 1016, the electronic device may set the update period as the time $T_1$. When the latitude value is larger than the first threshold value and smaller than the second threshold value, the first electronic device 4110 may set the ephemeris update period as the time $T_1$. As described above, when the ephemeris update period is set as the time $T_1$, the first electronic device 410 may make a request for updating the ephemeris to the second electronic device 460 at every time $T_1$.

In operation 1018, the electronic device may compare a latitude value of the current location with a preset threshold value. The first electronic device 410 may set the ephemeris update period by comparing the detected latitude value of the current location with a preset $N-1^{th}$ threshold value and an $N^{th}$ threshold value. The first electronic device 410 may determine whether the detected latitude value of the current location exists within a range of the $N-1^{th}$ threshold value and the $N^{th}$ threshold value. The first electronic device 410 may determine whether the latitude value is larger than the $N-1^{th}$ threshold value and smaller than the $N^{th}$ threshold value. For example, when the latitude value is larger than the $N-1^{th}$ threshold value and smaller than the $N^{th}$ threshold value, the first electronic device 410 may set the ephemeris update period as a time $T_N$.

In operation 1020, the electronic device may set the update period as the time $T_N$. When the latitude value is larger than the $N-1^{th}$ threshold value and smaller than the $N^{th}$ threshold value, the first electronic device 410 may set the ephemeris update period as the time $T_N$. As described above, when the ephemeris update period is set as the time $T_N$, the first electronic device 410 may make a request for updating the ephemeris to the second electronic device 460 at every time $T_N$. The first threshold value, the second threshold value, the third threshold value, . . . , the $N^{th}$ threshold value may have values in descending order or ascending order, and may be variably controlled. Further, $T_1$, $T_2$, . . . $T_N$ may also have values in descending order or ascending order, and may be variably controlled. In general, the earth is modeled as an ellipsoid, and satellites move along oval trajectories. Accordingly, the trajectories of satellites respectively orbiting the equator and the polar region at the same time may be different, so that the ephemeris update period is set to be longer than that in the equator in the present disclosure.

Figure 11:
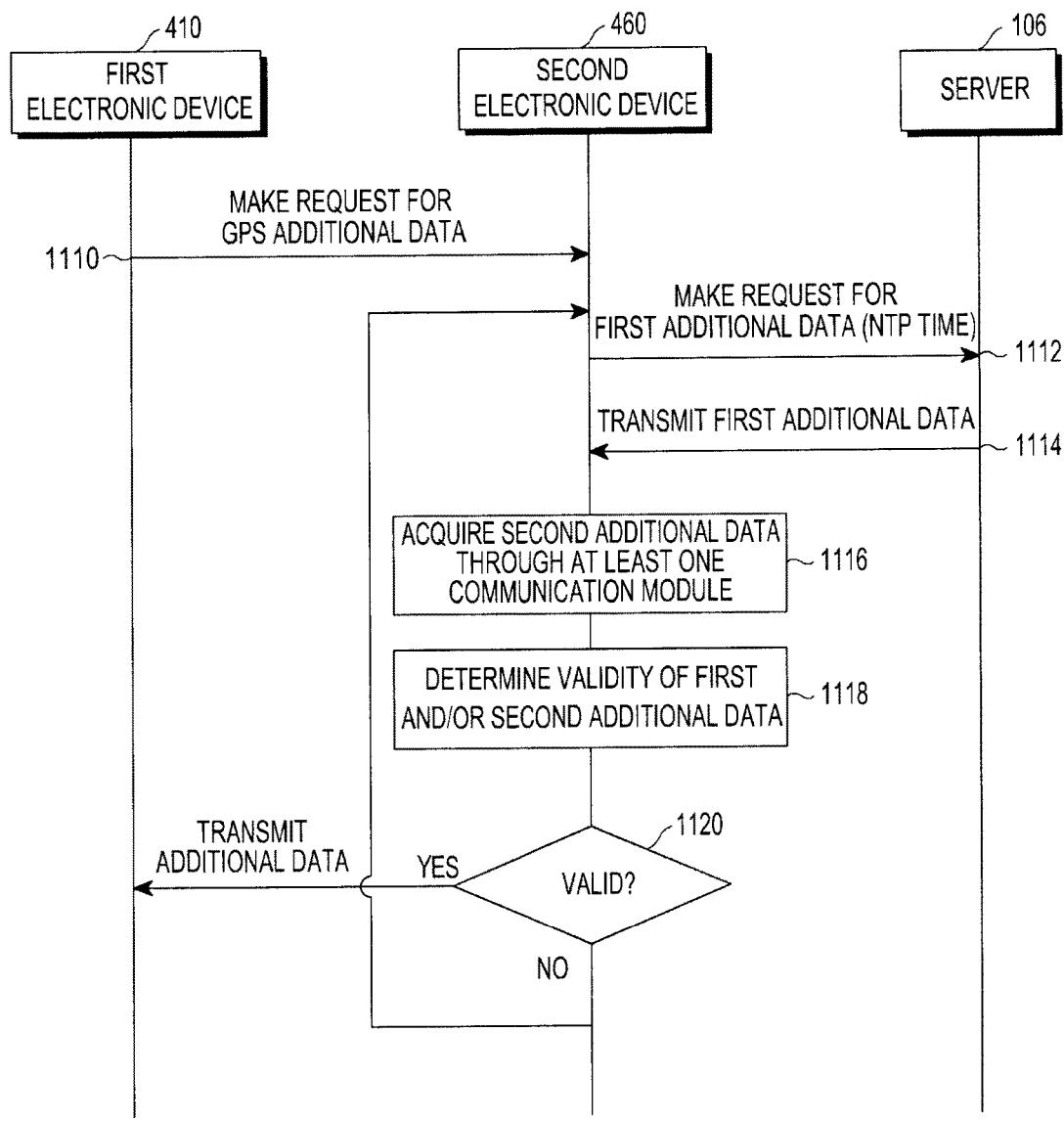
FIG. 11 is a flowchart illustrating the operation of determining the validity of additional data by the second electronic device according to an embodiment of the present disclosure.

FIG. 11 is a flowchart illustrating the operation of determining the validity of additional data by the second electronic device according to an embodiment of the present disclosure.

Hereinafter, the operation of determining the validity of additional data by the second electronic device according to an embodiment of the present disclosure will be described in detail with reference to FIG. 11.

In operation 1110, the electronic device may transmit a request for GPS additional data. The first electronic device 410 may transmit the request for GPS additional data to the second electronic device 460 which is connected through the communication module 440 (for example, Bluetooth communication module 441). The first electronic device 410 may transmit the request for GPS additional data to the second electronic device 460 in order to update the NTP time information and the reference location. When the location change is detected, the first electronic device 410 may update the NTP time. When a predetermined time passes after the first electronic device 410 receives initial NTP time information from the second electronic device 460 or when the location of the user having the first electronic device 410 is changed, the first electronic device 410 may update the NTP time information and generate a request for GPS additional data to the second electronic device 460. Alternatively, when there is no additional data or when it is determined that the update of the additional data is desirable, the first electronic device 410 may generate and transmit the request for additional data to the second electronic device 460.

In operation 1112, the second electronic device 460 may transmit a request for updating the NTP time information of the first electronic device to the server 106. When the request for GPS additional data is received from the first electronic device 410, the second electronic device 460 may transmit first additional data requesting the NTP time to the server 106.

In operation 1114, the second electronic device 460 may receive a transmission of the first additional data including the NTP time from the server 106. The second electronic device 460 may receive a transmission of the first additional data from the server 106 in response to the request for the NTP time made to the server 106.

In operation 1116, the second electronic device 460 may acquire second additional data through at least one communication module. The second electronic device 460 may acquire the second additional data through at least one provided communication module. The second electronic device 460 may acquire the second additional data including the reference location from the GNSS module 492, the Wi-Fi module 493, and the network cell according to the GNSS and the network state.

In operation 1118, the second electronic device 460 may determine the validity of the first additional data and/or the second additional data. The second electronic device may determine whether at least one of the first additional data received from the server and the acquired second additional data is available (or valid). The second electronic device 460 may determine whether the NTP time included in the first additional data received from the server 106 is available (or valid) or not. For example, the second electronic device 460 may calculate the difference between the time at which the NTP time request is transmitted and the time at which the response to the NTP time request is received and determine the validity based on the calculated difference. The second electronic device 460 may determine the validity based on server-based NTP time information received from the server 106. The second electronic device 460 may determine whether the reference location included in the second additional data acquired from the GNSS module 492, the Wi-Fi module 493, and the network cell is available (or valid) according to the GNSS and the network state. For example, in order to update the additional data of the first electronic device 410, the second electronic device 460 may activate at least one communication module included therein and acquire the reference location. The second electronic device 460 may acquire the reference location from the GNSS module 492, the Wi-Fi module 493, and the network cell according to the GNSS and the network state. The second electronic device 460 may determine the validity of at least one piece of the first additional data and the second additional data.

In operation 1120, when at least one piece of the first additional data and the second additional data is available (or valid), the second electronic device 460 may transmit valid additional data to the first electronic device 410. The additional data transmitted to the first electronic device 410 may include at least one of the valid NTP time information and the valid reference location. Further, in operation 1120, when at least one piece of the first additional data and the second additional data is not valid, the second electronic device 460 may retransmit the request for the first additional data that makes the request for the NTP time to the server 106. For example, when neither the first additional data nor the second additional data is available (or valid), the second electronic device 460 may retransmit the request for the first additional data that makes the request for the NTP time to the server 106. For example, when the second additional data is not valid, the second electronic device 460 may re-acquire the second additional data including the reference location from the GNSS module 492, the Wi-Fi module 493, and the network cell according to the GNSS and the network state. The determination of the validity of the NTP time information may be performed by the second electronic device 460 or the first electronic device 101.

Figure 12:
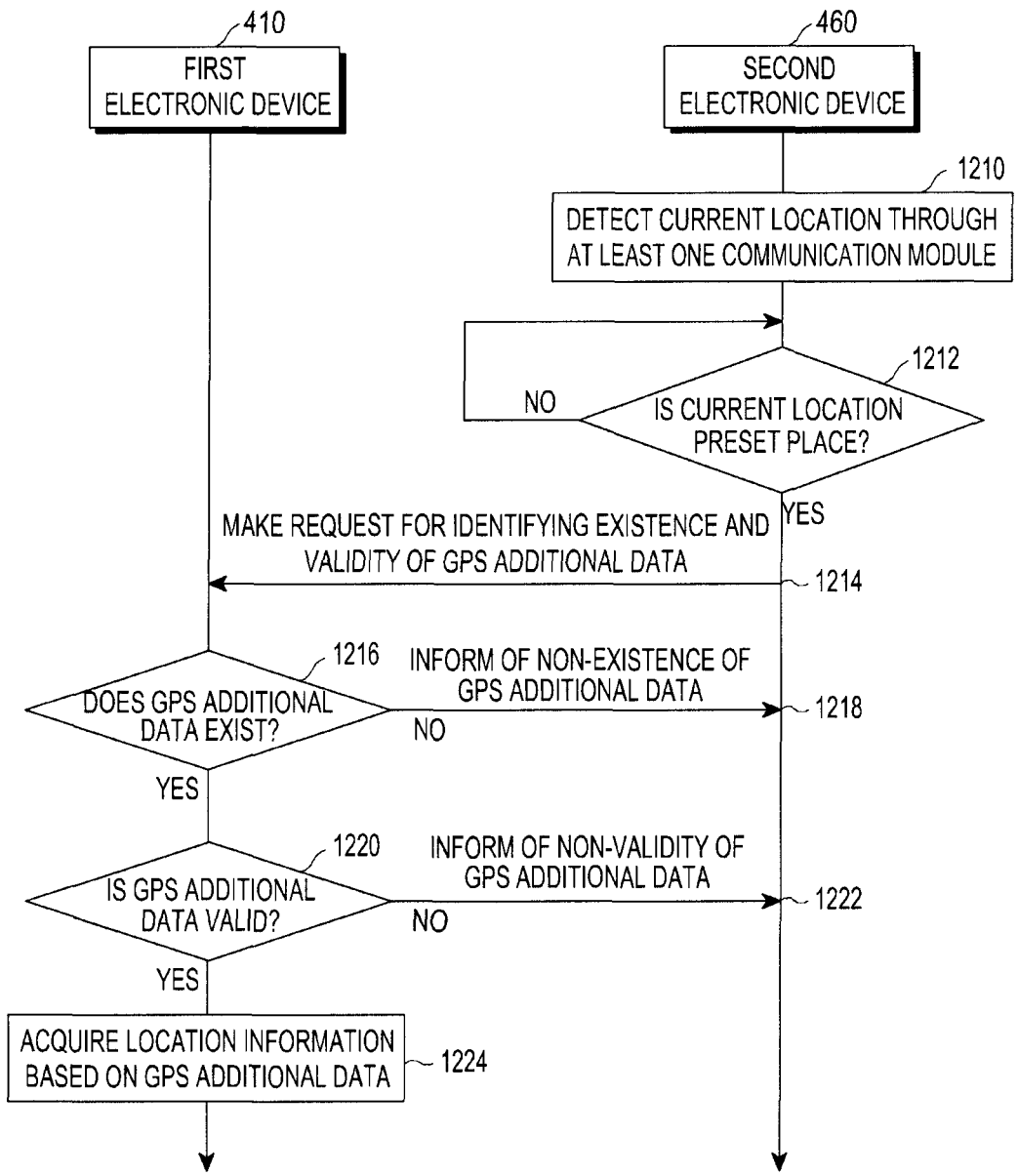
FIG. 12 is a flowchart illustrating the operation in which the second electronic device makes a request for identifying validity to the first electronic device and in which the first electronic device acquires location information according to an embodiment of the present disclosure.

FIG. 12 is a flowchart illustrating the operation in which the second electronic device transmits a request for identifying validity to the first electronic device and the first electronic device acquires location information according to an embodiment of the present disclosure.

In operation 1210, the second electronic device 460 may detect the current location through at least one communication module. The second electronic device 460 may acquire the current location through at least one provided communication module. In order to update the location of the first electronic device 410, the second electronic device 460 may activate at least one communication module included therein and acquire the current location. The second electronic device 460 may acquire the current location from the GNSS module 492, the Wi-Fi module 493, and the network cell according to the GNSS and the network state.

In operation 1212, the second electronic device 460 may determine whether the current location is a preset place. The second electronic device 460 may determine whether the current location is the preset place (such as, for example, a preset golf course) based on the current location acquired through at least one communication module included therein. In order to indicate to the first electronic device 410 of (or update) the current location, the second electronic device 460 may determine whether the current location, acquired through the activation of at least one communication module included therein, is the preset place. The second electronic device 460 may determine whether the current location acquired from the GNSS module 492, the Wi-Fi module 493, and the network cell according to the GNSS and the network state exists within a preset area (or place).

In operation 1214, the second electronic device 460 may generate and transmit a request for identifying the existence of GPS additional data and the validity thereof. The second electronic device 460 may generate and transmit the request for identifying the validity in order to indicate whether there is location information in the first electronic device 410. The second electronic device 460 may generate and transmit the request for identifying the validity in order to determine whether the location information stored in the first electronic device 410 is available (or valid) or not. When the acquired current location matches the preset place, the second electronic device 460 may transmit a message requesting identification of at least one of the existence of the GPS additional data and the validity thereof to the first electronic device 410.

In operation 1216, the first electronic device 410 may detect whether there is GPS additional data. When a request for identifying the validity is received from the second electronic device 460, the first electronic device 410 may detect whether the location information is stored in the memory 450 or whether the location information is updated in the GNSS module 442. When the request for identifying the validity is received from the second electronic device 460, the first electronic device 410 may detect whether there is the GPS additional data in the memory 450 included in the first electronic device 410. When GPS additional data is found to exist based on a result of the identification, the validity of the additional data can be determined.

In operation 1218, the first electronic device 410 may detect that no GPS additional data exists. For example, when the location information is not stored in the memory 450 or the location information is not updated in the GNSS module 442, the first electronic device 410 may inform the second electronic device 460 that the location information does not exist or is not updated.

In operation 1220, the first electronic device 410 may detect whether the GPS additional data is available (or valid). When the request for detecting the validity is received from the second electronic device 460, the first electronic device 410 may identify whether the GPS additional data stored in the memory 450 is available (or valid) or whether the location information updated in the GNSS module 442 is available (or valid).

In operation 1222, the first electronic device 410 may detect that the GPS additional data is not valid. When the GPS additional data exists but is not valid, the first electronic device 410 may inform the second electronic device 460 that the location information is not valid. For example, when the GPS additional data stored in the memory 450 is not valid or the location information updated in the GNSS module 442 is not valid, the first electronic device 410 may inform the second electronic device 460 that the location information is not valid.

In operation 1224, the first electronic device 410 may acquire the location information based on the GPS additional data. When the GPS additional data stored in the memory 450 is available (or valid) or the location information updated in the GNSS module 442 is available (or valid), the first electronic device 410 may acquire the current location information.

Figure 13:
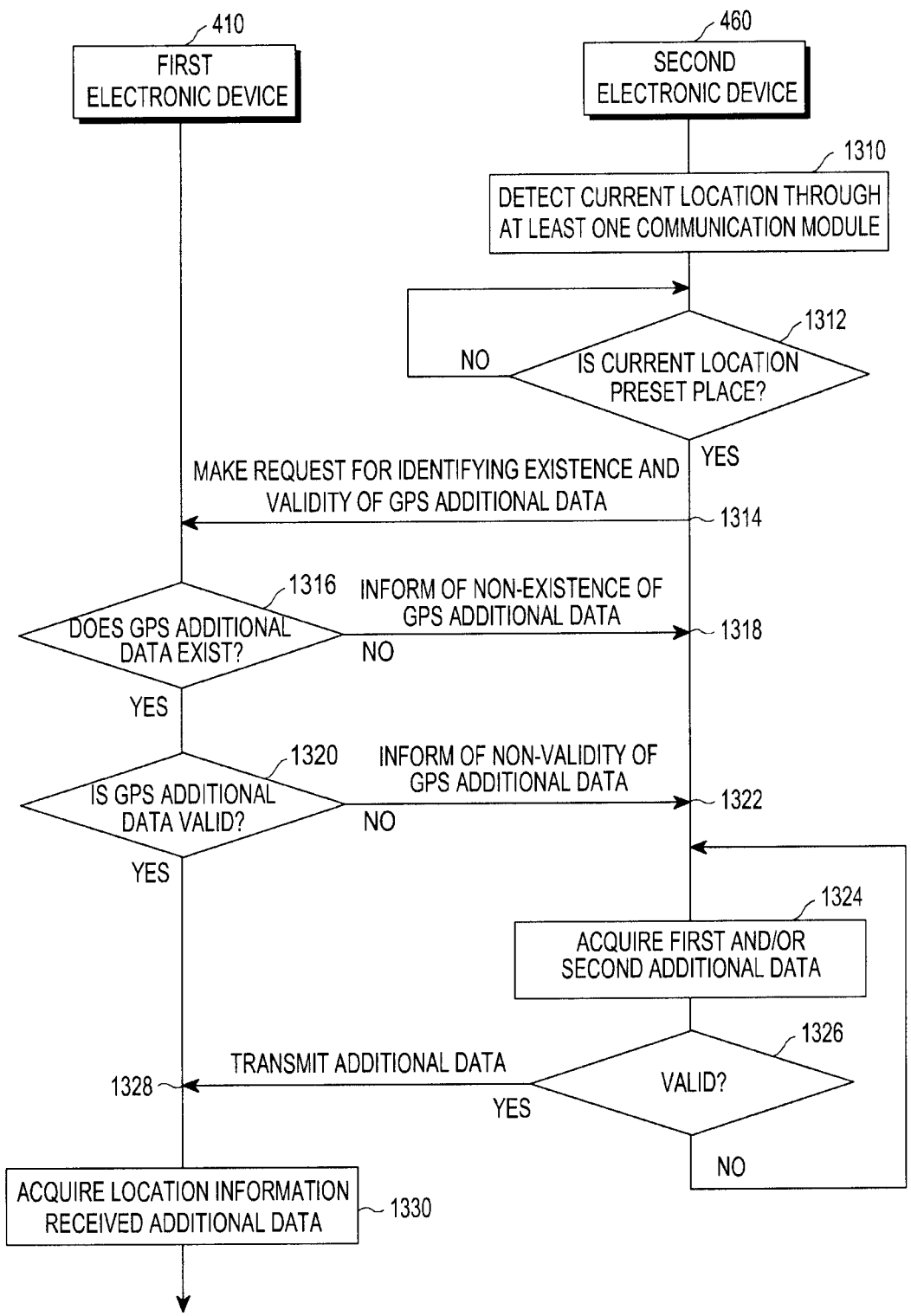
FIG. 13 is a flowchart illustrating the operation in which the second electronic device makes a request for identifying validity to the first electronic device and in which the first electronic device receives additional data of which the validity is identified by the second electronic device and updates the location information according to another embodiment of the present disclosure.

FIG. 13 is a flowchart illustrating the operation in which the second electronic device makes a request for identifying validity to the first electronic device and the first electronic device receives additional data of which the validity is identified by the second electronic device and updates the location information according to another embodiment of the present disclosure.

In operation 1310, the second electronic device 460 may detect the current location through at least one communication module. The second electronic device 460 may acquire the current location through at least one provided communication module. In order to update the location of the first electronic device 410, the second electronic device 460 may activate at least one communication module included therein and acquire the current location. The second electronic device 460 may acquire the current location from the GNSS module 492, the Wi-Fi module 493, and the network cell according to the GNSS and the network state.

In operation 1312, the second electronic device 460 may determine whether the current location is a preset place. The second electronic device 640 may determine whether the current location is the preset place (for example, a preset golf course) based on the current location acquired through at least one communication module included therein. In order to inform the first electronic device 410 of (or update) the current location, the second electronic device 460 may determine whether the current location, acquired through the activation of at least one communication module included therein, is the preset place. The second electronic device 460 may determine whether the current location, acquired from the GNSS module 492, the Wi-Fi module 493, and the network cell according to the GNSS and the network state, exists within a preset area (or place).

In operation 1314, the second electronic device 460 may make a request for identifying the existence of GPS additional data and the validity thereof. The second electronic device 460 may make the request for identifying the validity in order to inform whether there is location information in the first electronic device 410. The second electronic device 460 may make the request for identifying the validity in order to find out whether the location information stored in the first electronic device 410 is available (or valid) or not. When the acquired current location is the preset place, the second electronic device 460 may transmit a message that makes a request for identifying at least one of the existence of the GPS additional data and the validity thereof to the first electronic device 410.

In operation 1316, the first electronic device 410 may identify whether there is GPS additional data. When the request for identifying the validity is received from the second electronic device 460, the first electronic device 410 may identify whether the location information is stored in the memory 450 or whether the location information is updated in the GNSS module 442. When the request for identifying the validity is received from the second electronic device 460, the first electronic device 410 may identify whether there is the GPS additional data in the memory 450 included in the first electronic device 410. When the GPS additional data is found to exist based on the result of the identification, the validity of the additional data can be determined.

In operation 1318, the first electronic device 410 may indicate that the GPS additional data does not exist. For example, when the location information is not stored in the memory 450 or the location information is not updated in the GNSS module 442, the first electronic device 410 may inform the second electronic device 460 that the location information does not exist or is not updated.

In operation 1320, the first electronic device 410 may identify whether the GPS additional data is available (or valid). When the request for identifying the validity is received from the second electronic device 460, the first electronic device 410 may identify whether the GPS additional data stored in the memory 450 is available (or valid) or whether the location information updated in the GNSS module 442 is available (or valid).

In operation 1322, the first electronic device 410 may indicate that the GPS additional data is not valid. When the GPS additional data exists but is not valid, the first electronic device 410 may inform the second electronic device 460 that the location information is not valid. For example, when the GPS additional data stored in the memory 450 is not valid or the location information updated in the GNSS module 442 is not valid, the first electronic device 410 may inform the second electronic device 460 that the location information is not valid.

In operation 1324, the second electronic device 460 may acquire first and/or second additional data. When a response indicating that the GPS additional data of the first electronic device 410 is not valid is received, the second electronic device 460 may acquire the first additional data and/or the second additional data. In order to acquire the first additional data, the second electronic device 460 may transmit a request for updating NTP time information to the server 106. The second electronic device 460 may receive the first additional data including the NTP time from the server 106. The second electronic device 460 may receive the first additional data from the first electronic device 410 in response to the request for the NTP time. Further, the second electronic device 460 may acquire the second additional data through at least one communication module. The second electronic device 460 may acquire the second additional data through at least one provided communication module. The second electronic device 460 may acquire the second additional data including the reference location from the GNSS module 492, the Wi-Fi module 493, and the network cell according to the GNSS and the network state.

In operation 1326, the second electronic device 460 may determine whether the first and/or second additional data is available (or valid). The second electronic device 460 may determine whether at least one piece of the first additional data and the second additional data is available (or valid). For example, when at least one piece of the first additional data and the second additional data is not valid, the second electronic device 460 may retransmit the request for the first additional data that makes the request for the NTP time to the server 106. In another example, when both the first additional data and the second additional data are invalid, the second electronic device 460 may retransmit the request for the first additional data that makes the request for the NTP time to the server 106. In yet another example, when the second additional data is not valid, the second electronic device 460 may re-acquire the second additional data including the reference location from the GNSS module 492, the Wi-Fi module 493, and the network cell according to the GNSS and the network state. The determination of the validity of the NTP time information may be performed by the second electronic device 460 or the first electronic device 101.

When the first and/or second additional data is available (or valid), the second electronic device 460 may transmit the additional data in operation 1328. When at least one piece of the first additional data and the second additional data is available (or valid), the second electronic device 460 may transmit valid additional data to the first electronic device 410. The additional data transmitted to the first electronic device 410 may include at least one of the valid NTP time information and the valid reference location.

The first electronic device 410 may acquire location information based on the received additional data in operation 1330. The first electronic device 410 may detect the current location based on the data stored in the memory 450 or the location information updated in the GNSS module in response to the request for the current location of the first electronic device 410 by a request from the user or an executed application.

Figure 14:
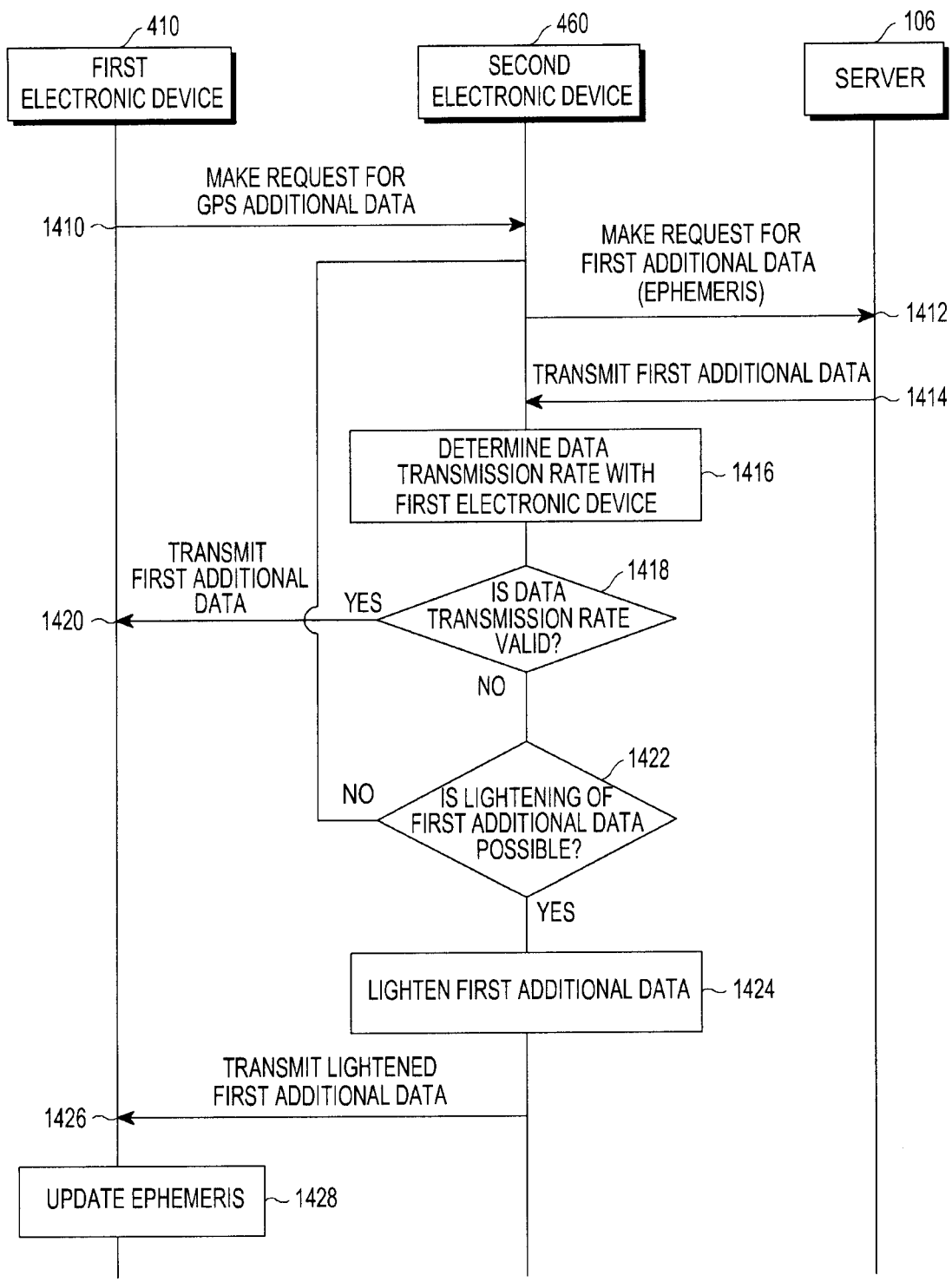
FIG. 14 is a flowchart illustrating the operation of determining the validity of ephemeris information by the electronic device according to an embodiment of the present disclosure.

FIG. 14 is a flowchart illustrating the operation of determining the validity of ephemeris information by the electronic device according to an embodiment of the present disclosure.

Hereinafter, the operation of determining the validity of ephemeris information by the electronic device according to an embodiment of the present disclosure will be described in detail with reference to FIG. 14.

In operation 1410, the electronic device may generate and transmit a request for GPS additional data. The first electronic device 410 may generate and transmit a request for GPS additional data to the second electronic device 460. The first electronic device 410 may generate and transmit the request for GPS additional data to the second electronic device 460 in order to update ephemeris information. When a location change is detected, the first electronic device 410 may update the ephemeris information. When a predetermined time passes after the first electronic device 410 receives initial ephemeris information from the second electronic device 460, or when the location of the user having the first electronic device 410 is changed, the first electronic device 410 may update the ephemeris information and make a request for GPS additional data to the second electronic device 460 to update the ephemeris information.

In operation 1412, the second electronic device 460 may transmit a request for updating the ephemeris information of the first electronic device to the server 106. When the request for the GPS additional data is received from the first electronic device 410, the second electronic device 410 may transmit first additional data that makes the request for ephemeris to the server 106.

In operation 1414, the second electronic device 460 may receive the first additional data including the ephemeris information from the server 106. The second electronic device 460 may receive the first additional data from the first electronic device 410 in response to the request for the ephemeris information.

In operation 1416, the second electronic device 460 may determine a data transmission rate with the first electronic device 410. When transmitting the first additional data to the first electronic device 410, the second electronic device 460 may suffer data loss due to issues with the available bandwidth between the first electronic device 410 and the second electronic device 460. Accordingly, the second electronic device 460 may determine the rate of data transmission with the first electronic device 410.

In operation 1418, the second electronic device 460 may determine whether the data transmission rate is available (or valid) (e.g., greater than a preset threshold). The second electronic device 460 may determine whether the transmission rate of the first additional data transmitted to the first electronic device 410 is available (or valid). The second electronic device 460 may determine whether the bandwidth through which the first additional data is transmitted to the first electronic device 410 is sufficient. The second electronic device 460 may determine the data transmission rate with the first electronic device 410 and determine the validity of the transmission rate based on the size of the first additional data transmitted from the server 106.

When the data transmission rate is available (or valid) in operation 1418, the second electronic device 460 may transmit the first additional data. When the data transmission rate is available (or valid), the second electronic device 460 may transmit the first additional data received from the server 106 to the first electronic device 410. The second electronic device 460 may receive ephemeris information from satellites of a plurality of countries (for example, Galileo, GLONASS, Beidou, and the like) through the server 106. In order to transmit a plurality of pieces of ephemeris information to the first electronic device, the second electronic device 460 may determine the data transmission rate with the first electronic device 410. For example, when the second electronic device 460 is connected to the first electronic device 410 through Bluetooth, the transmission rate may vary depending on the Bluetooth mode, and is different if the manufacturer of the electronic device is different. [Table 1] below shows the transmission difference according to the Bluetooth mode.

TABLE 1

| Low-Energy BlueTooth | Reduce power consumption, expand battery life, and transmit data at low speed |
| Classic BlueTooth | Conventional Bluetooth technology from 1.0 to 2.1 |
| High-Speed BlueTooth | High speed transmission technology using Wi-Fi |

In operation 1422, the second electronic device 460 may determine whether the first additional data can be lightened. When the data transmission rate is not valid, the second electronic device 460 may determine whether the first additional data can be lightened.

In operation 1424, the second electronic device 460 may lighten the first additional data. When the size of the first additional data is large in comparison with the data transmission rate, the second electronic device 460 may process the lightening of the first additional data. For example, when there is a large amount of GPS ephemeris information, additional data may be re-configured based on data including satellites having a good GPS state through a lightening reference. [Table 2] below shows a GPS data lightening reference.

TABLE 2

| Lightening reference | Satellite state is good | Satellite state is bad |
| --- | --- | --- |
| Accuracy | low | high |
| Multipath | small | large |
| DOP | high | low |
| Quality (SNR) | high | low |

The lightening corresponds to reducing satellite data having good quality and the number of satellites. The second electronic device 460 may transmit the first additional data containing some (for example, 4 to 8 pieces of) satellite data, among the plurality of pieces of satellite data, to the first electronic device 410.

In operation 1426, the second electronic device 460 may transmit the lightened first additional data to the first electronic device 410. The lightened additional data may be transmitted to the first electronic device 410, and the first electronic device 410, having received the lightened additional data from the second electronic device, may update ephemeris information based on the corresponding additional data.

In operation 1428, the first electronic device 410 may update ephemeris information. The first electronic device 410 may receive the first additional data in response to a request for data required for updating the ephemeris information of the first electronic device 410. The first electronic device 410 may store the received first additional data in the memory 450. The first electronic device 410 may update the ephemeris information included in the received first additional data in the Global Navigation Satellite System (GNSS) module included in the communication module 440. The first electronic device 410 may update the ephemeris of the first electronic device 410 based on the ephemeris information updated in the GNSS module.

Figure 15A:
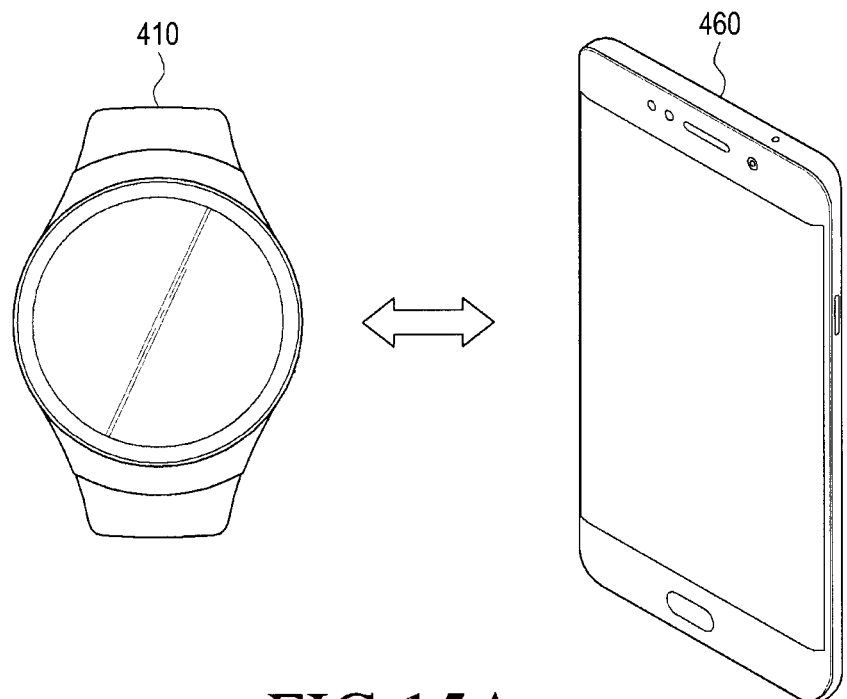
FIG. 15A illustrates an example of the first electronic device and the second electronic device according to various embodiments of the present disclosure.
Figure 15B:
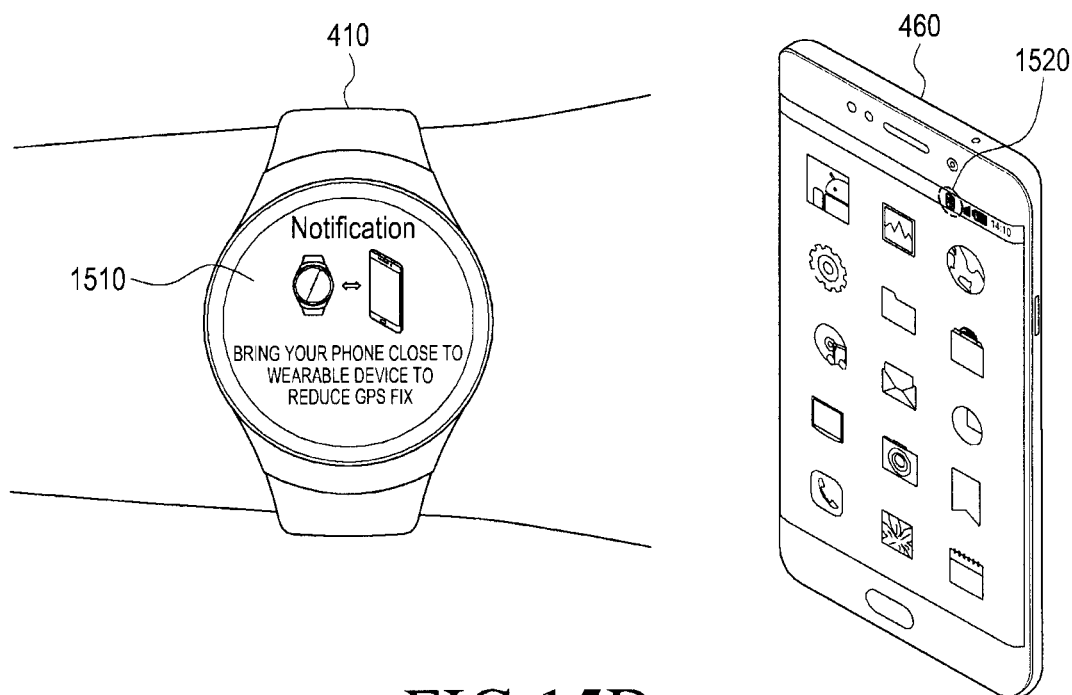
FIG. 15B illustrates an example of connection between the first electronic device and the second electronic device through short-range communication according to various embodiments of the present disclosure.

FIG. 15A illustrates an example of the first electronic device and the second electronic device according to various embodiments of the present disclosure, and FIG. 15B illustrates an example in which the first electronic device and the second electronic device are connected to each other through short-range communication according to various embodiments of the present disclosure.

Referring to FIGS. 15A and 15B, the first electronic device 410 may discover at least one second electronic device 460 located adjacent to the first electronic device 410. The first electronic device 410 may scan for at least one connectable electronic device adjacent to the first electronic device 410 through a short-range communication module and determine a connectable (or available) electronic device among at least one scanned electronic device. The first electronic device 410 may not be equipped with a GPS reception module for receiving Global Positioning System (GPS) information from an external electronic device, but the second electronic device 460 may be equipped with a GPS reception module. Alternatively, the first electronic device 410 may equipped with a GPS reception module for receiving GPS information from the external electronic device, but the second electronic device 460 may be not equipped with a GPS reception module. For example, when the first electronic device 410 is equipped with the GPS reception module and the second electronic device 460 is not equipped with the GPS reception module, the second electronic device 460 may discover the first electronic device 410 located adjacent to the second electronic device 460.

When the second electronic device 460 is found, the first electronic device 410 may display a screen 1510 that makes a request for approaching the second electronic device. Further, when the second electronic device 460 is connected to the first electronic device through short-range communication, the second electronic device 460 may display an icon 1520 (for example, Bluetooth, Wi-Fi, or the like) indicating the connection.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by control circuits, the control circuits may perform a function corresponding to the command. The computer-readable storage medium may, for example, be the memory 130. At least some of the programming modules may be implemented (for example, executed) by, for example, the processor. At least some of the programming modules may include, for example, a module, a program, a routine, a set of instructions or a process for performing one or more functions.

The computer readable recoding medium includes magnetic media such include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program command, such as a Read Only Memory (ROM), a Random Access Memory (RAM) and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. According to various embodiments, a storage medium having instructions stored therein is provided. In a method of acquiring additional data for location information acquisition by a wearable electronic device including a communication module, a memory, and at least one processor electrically connected to the communication module and the memory, the instructions may include a first instruction set for, when an update of at least one piece of additional data utilized for acquiring location information is requested, connecting to at least one neighboring electronic device through a first module included in the communication module, an operation of transmitting a request for updating the additional data to the at least one neighboring electronic device through the first module, a second instruction set for receiving at least one piece of additional data through the first module in response to the request and determining the validity thereof, and a third instruction set for acquiring location information of the electronic device through a second module included in the communication module based on at least one piece of the additional data of which the validity is determined.

Example embodiments of the present disclosure shown and described in this specification and the drawings correspond to specific examples presented in order to easily describe technical contents of the present disclosure and to help comprehension of the present disclosure, and are not intended to limit the present disclosure. Therefore, it should be construed that, in addition to the embodiments disclosed herein, all modifications and changes or modified and changed forms derived from the technical idea of the present disclosure fall within the present disclosure.

What is claimed is:

1. An electronic device comprising:
   a global navigation satellite system (GNSS) module;
   a communication module;
   a memory; and
   at least one processor operably coupled to the communication module and the memory, configured to:
   receive, through the GNSS module, a data transmitted from a satellite;
   in response to identifying at least one pre-determined condition related to first additional data among a plurality of additional data being satisfied, transmit a request message for receiving a second additional data for updating the first additional data to at least one external electronic device in communicable range of the communication module;

in response to transmitting the request message, receive the second additional data via the communication module;

identify a validity of the second additional data; and in response to identifying the second additional data being valid, identify a present location of the electronic device based at least partially on the data received through the GNSS module and the second additional data.

2. The electronic device of claim 1, wherein the at least one processor is further configured to identify the at least one pre-determined condition being satisfied by identifying a change in the present location of the electronic device.

3. The electronic device of claim 2, wherein the at least one processor is further configured to transmit a first request message to update the present location of the electronic device to the at least one external electronic device.

4. The electronic device of claim 1, wherein the at least one additional data includes at least one of server-based network time protocol (NTP) time information, network-based reference location information, and satellite-based ephemeris information.

5. The electronic device of claim 4, wherein the transmitted request message includes a first request for the server-based NTP time information, the second additional data includes the server-based NTP time information, and the server-based NTP includes time information indicates a time difference, identified by the at least one external electronic device, between a first time when the at least one external electronic device transmit the first request for the server-based NTP time information to an external server and a second time when the at least one external device receives a response of the server-based NTP time information from the external server.

6. The electronic device of claim 4, wherein when the second additional data includes the network-based reference location information, the request message includes a second request to update a reference location, which causes the at least one external electronic device to detect a new reference location via at least one of the GNSS module, a wi-fi module, and a cellular module operatively coupled to the at least one external electronic device.

7. The electronic device of claim 6, wherein the at least one processor is further configured to:

identify a third request for the present location generated by a predetermined application executing on the electronic device; and in response to identifying the third request for the present location, identify whether to provide a location information updated to the GNSS module according to whether an accuracy of a reference location acquisition method pre-stored in the memory falls within a predetermined range.

8. The electronic device of claim 7, wherein the at least one processor is further configured to, when the reference location acquisition method includes cellular location detection by the at least one external electronic device and the accuracy of the reference location acquisition method is within the predetermined range, reject use of the location information updated to the GNSS module.

9. The electronic device of claim 4, wherein the second additional data includes the satellite-based ephemeris information, and the at least one processor is further configured to:

identify the present location based on the network-based reference location information; and identify an update period for updating the satellite-based ephemeris information by comparing a latitude of the identified present location with a preset threshold value.

10. The electronic device of claim 1, wherein the at least one processor is further configured to:

store at least one piece of the second additional data in the memory.

11. The electronic device of claim 1, wherein the second additional data includes server-based network time protocol (NTP) time information generated when the at least one external electronic device transmits an NTP time request to an external server and receives an NTP time response from the external server, and wherein the second additional data is identified as valid when a time difference between transmitting the NTP time request and receiving the NTP time response is less than a predetermined threshold.

12. The electronic device of claim 1, wherein the at least one processor is further configured to:

receive a second request message to identify an existence and a validity of a first location information indicating the present location; and in response to identifying the first location information being as nonexistent or invalid, transmitting a fourth request for second location information to the at least one external electronic device, wherein the second additional data includes the second location information.

13. A method of an electronic device, comprising:

receiving, through a global navigation satellite system (GNSS) module, a data transmitted from a satellite;

in response to identifying at least one pre-determined condition related to first additional data among a plurality of additional data being satisfied, transmitting a request message for receiving a second additional data for updating the first additional data to at least one external electronic device in communicable range of a communication module;

in response to transmitting the request message, receiving the second additional data via the communication module;

identifying a validity of the second additional data; and in response to identifying the second additional data being valid, identifying a present location of the electronic device based at least partially on the data received through the GNSS module and the second additional data.

14. The method of claim 13, further comprising:

storing at least a portion of the second additional data in memory.

15. The method of claim 13, wherein the second additional data includes server-based network time protocol (NTP) time information generated when the at least one external electronic device transmits an NTP time request to an external server, and receives an NTP time response from the external server, and wherein the second additional data is detected as valid when a time difference between transmitting the NTP time request and receiving the NTP time response is less than a predetermined threshold.

16. The method of claim 13, further comprising:
identifying the pre-determined condition being satisfied by identifying a change in the present location of the electronic device.

17. An electronic device, comprising:
a communication module;
a memory; and
at least one processor operably coupled to the communication module and the memory, configured to:
receive a request message for receiving first additional data from an external electronic device, wherein the request message is received when the external electronic device identifies at least one pre-determined condition related to second additional data among a plurality of additional data being satisfied;
acquire the second additional data in response to the request message;
identify at least one of validity, transmission rate, and lightweight of the second additional data; and
transmit the second additional data to the external electronic device, wherein the external electronic device identifies a present location of the external electronic device based on the second additional data.

18. The electronic device of claim 17, wherein the second additional data includes at least one of server-based network time protocol (NTP) time information, network-based reference location information, and satellite-based ephemeris information.

19. The electronic device of claim 17, wherein the processor is further configured to:
transmit a first request message to identify an existence and a validity of first location information indicating the present location; and
in response to identifying the first location information being as nonexistent or invalid, receiving a request for second location information from the external electronic device.

* * * * *